(12) United States Patent
Park et al.

(10) Patent No.: US 12,438,967 B2
(45) Date of Patent: Oct. 7, 2025

(54) ELECTRONIC DEVICE INCLUDING OPENABLE AND CLOSABLE PIPELINE

(71) Applicant: Samsung Electronics Co., Ltd., Suwon-si (KR)

(72) Inventors: Junghyun Park, Suwon-si (KR); Minsoo Kim, Suwon-si (KR); Joohan Kim, Suwon-si (KR); Yonggil Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 233 days.

(21) Appl. No.: 18/465,508

(22) Filed: Sep. 12, 2023

(65) Prior Publication Data

US 2024/0073304 A1     Feb. 29, 2024

Related U.S. Application Data

(63) Continuation of application No. PCT/KR2023/012479, filed on Aug. 23, 2023.

(30) Foreign Application Priority Data

Aug. 30, 2022    (KR) .................. 10-2022-0108942
Oct. 13, 2022    (KR) .................. 10-2022-0131440

(51) Int. Cl.
*H04M 1/02*      (2006.01)
*G06F 1/16*      (2006.01)

(52) U.S. Cl.
CPC ......... *H04M 1/0237* (2013.01); *G06F 1/1624* (2013.01)

(58) Field of Classification Search
CPC ........ G06F 1/16; G06F 1/1624; G06F 1/1652; G06F 1/1656; G06F 1/1681;
(Continued)

(56) References Cited

U.S. PATENT DOCUMENTS 10,904,371 B1 *   1/2021   Song ................. G06F 1/1656
2008/0165439 A1 *   7/2008   Chang ............... H04M 1/0264
                                                              359/822

(Continued)

FOREIGN PATENT DOCUMENTS

CN          108632406 A      10/2018
KR         10-1175514 B1      8/2012
(Continued)

OTHER PUBLICATIONS

Search Report dated Nov. 28, 2023, issued in In International application No. PCT/KR2023/012479.

*Primary Examiner* — Abhishek M Rathod
(74) *Attorney, Agent, or Firm* — Jefferson IP Law, LLP

(57) ABSTRACT

An electronic device is provided. The electronic device includes a first housing, a second housing slidably disposed with the first housing, a rollable display having a display area reduced or expanded based on slide-in or slide-out of the second housing, a pipeline having a first opening disposed on one side of the second housing for an inflow of external air flows, having a second opening disposed in a direction toward the first housing, and extending from the first opening in a direction toward the second opening, an air sensor disposed at least in part inside the pipeline, and an opening and closing member disposed to be fixed to the first housing and opening or closing the second opening of the pipeline based on slide-in or slide-out of the second housing.

20 Claims, 16 Drawing Sheets

(58) Field of Classification Search
CPC .. G06F 1/1686; G06F 1/1688; H04M 1/0237; H04M 1/0268; H04M 1/026; H04M 1/0235; H04M 1/0264; H04M 1/0277; H04M 1/0266; H04M 1/0269; H04M 1/03; H04M 1/035
See application file for complete search history.

(56) References Cited

U.S. PATENT DOCUMENTS

| | | | |
|---|---|---|---|
| 2013/0058063 A1* | 3/2013 | O'Brien | G06F 1/1624 |
| | | | 361/807 |
| 2014/0193018 A1 | 7/2014 | Lim et al. | |
| 2017/0212100 A1 | 7/2017 | Kwak et al. | |
| 2018/0084324 A1* | 3/2018 | Vitt | H04R 9/025 |
| 2021/0326569 A1 | 10/2021 | Song et al. | |
| 2022/0150619 A1* | 5/2022 | Park | H04R 1/2819 |
| 2023/0152859 A1* | 5/2023 | Kang | G09F 9/301 |
| | | | 361/679.01 |

FOREIGN PATENT DOCUMENTS

| | | |
|---|---|---|
| KR | 10-1627378 B1 | 6/2016 |
| KR | 10-1812940 B1 | 12/2017 |
| KR | 10-2020-0140985 A | 12/2020 |
| KR | 10-2333027 B1 | 12/2021 |
| KR | 10-2022-0017192 A | 2/2022 |
| KR | 10-2022-0071846 A | 5/2022 |
| WO | 2021/210710 A1 | 10/2021 |

* cited by examiner

ELECTRONIC DEVICE INCLUDING OPENABLE AND CLOSABLE PIPELINE

CROSS-REFERENCE TO RELATED APPLICATION(S)

This application is a continuation application, claiming priority under § 365(c), of an International application No. PCT/KR2023/012479, filed on Aug. 23, 2023, which is based on and claims the benefit of a Korean patent application number 10-2022-0108942, filed on Aug. 30, 2022, in the Korean Intellectual Property Office, and of a Korean patent application number 10-2022-0131440, filed on Oct. 13, 2022, in the Korean Intellectual Property Office, the disclosure of each of which is incorporated by reference herein in its entirety.

TECHNICAL FIELD

The disclosure relates to an electronic device including an openable and closable pipeline.

BACKGROUND ART

A portable electronic device may include a gas sensor and a fine dust sensor for measuring air quality. Used as the gas sensor of the portable electronic device may be an oxide semiconductor type sensor, an electrochemical type sensor, or an ion separation type sensor. The fine dust sensor of the mobile electronic device may be a light scattering type sensor.

The gas sensor and the fine dust sensor may be disposed such that a surface of the sensor or a region adjacent to the surface is exposed to external air. For example, the portable electronic device including the gas sensor and the fine dust sensor may have an inflow path through which the external air may flow in and diffuse, and the sensor may be disposed on the inflow path.

The above information is presented as background information only to assist with an understanding of the disclosure. No determination has been made, and no assertion is made, as to whether any of the above might be applicable as prior art with regard to the disclosure.

DISCLOSURE

Technical Problem

The gas sensor may be disposed to use a microphone hole or a speaker pipeline as an external air inlet. In order to prevent contamination by compounds, such as a battery, a tape, and a thermal interface material (TIM), contained inside the electronic device, the gas sensor may be disposed in a sealing structure that is isolated from an internal gas of the electronic device. With the gas sensor disposed in the sealing structure, the reaction speed of the gas sensor depends only on the natural diffusion of the external air and thus may be limited.

A heating type sensor or a blowing type sensor may be used as the fine dust sensor. The heating type sensor generates air flow through heating, but air inflow may not be smooth. The blowing type sensor has a separate fan to be advantageous to air inflow, but the portable electronic device may require a space for disposing the separate fan.

Therefore, an external air inflow structure that improves a reaction speed of a sensor for measuring air quality (e.g., a gas sensor, a fine dust sensor), prevents contamination of the sensor due to an internal gas, and separately has no arrangement structure such as a fan structure may be required.

Aspects of the disclosure are to address at least the above-mentioned problems and/or disadvantages and to provide at least the advantages described below. Accordingly, an aspect of the disclosure is to provide an electronic device including an openable and closable pipeline.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a first housing, a second housing slidably disposed with the first housing, a rollable display having a display area reduced or expanded based on slide-in or slide-out of the second housing, a pipeline having a first opening disposed on one side of the second housing for an inflow of external air flows, having a second opening disposed in a direction toward the first housing, and extending from the first opening in a direction toward the second opening, and an air sensor disposed at least in part inside the pipeline.

According to an embodiment, the electronic device may further include an opening and closing member disposed to be fixed to the first housing and opening or closing the second opening of the pipeline based on slide-in or slide-out of the second housing.

According to an embodiment, the electronic device may further include a piston member fixed at least in part to the first housing, disposed at least in part inside the pipeline, and moving in the pipeline based on slide-in or slide-out of the second housing.

According to an embodiment, the electronic device may further include a hinge member disposed in the second opening of the pipeline and closing or opening one end of the pipeline based on slide-in or slide-out of the second housing.

Advantageous Effects

An electronic device including an openable and closable pipeline according to an embodiment of the disclosure can improve a response speed of a sensor by allowing an external air to flow in through sliding of the electronic device.

An electronic device including an openable and closable pipeline according to an embodiment of the disclosure can prevent contamination of a sensor due to an internal gas by sealing the pipeline for gas inflow depending on sliding of the electronic device.

An electronic device including an openable and closable pipeline according to an embodiment of the disclosure can dispose a sensor in a relatively small arrangement space without a separate structure such as a fan structure.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
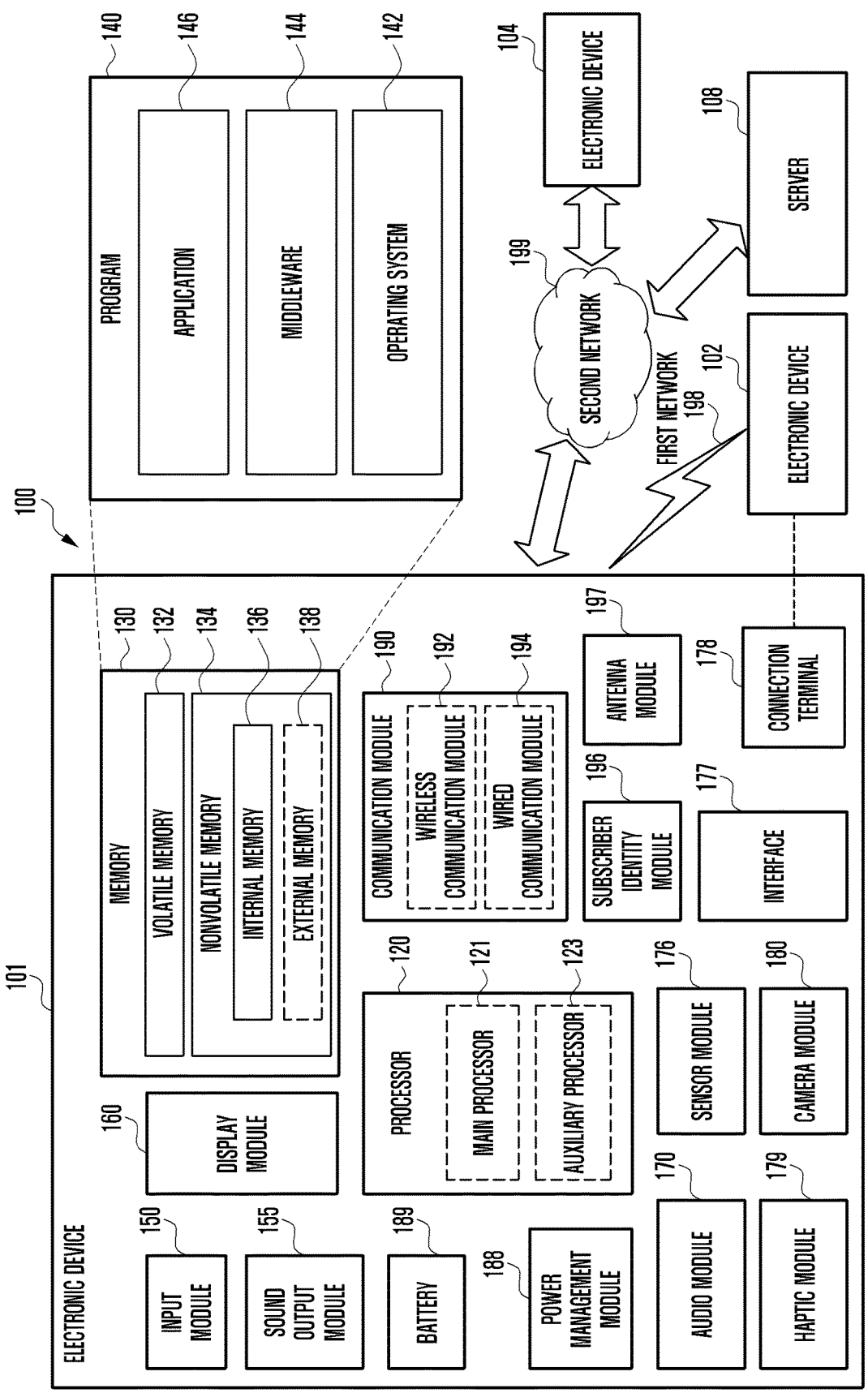
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beam-forming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
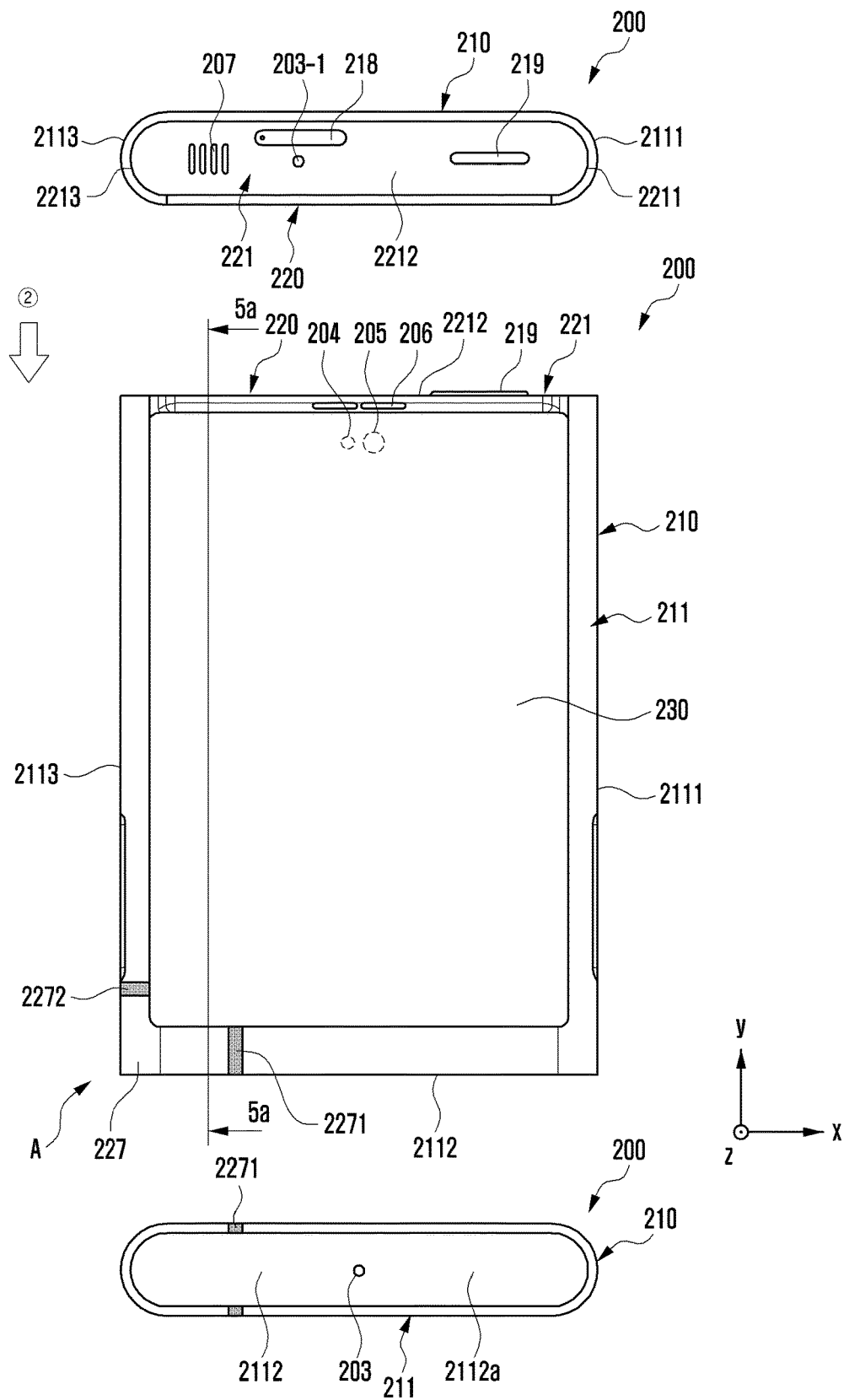
FIGS. 2A and 2B are diagrams illustrating the front and rear surfaces of an electronic device in a slide-in state according to various embodiments of the disclosure.
Figure 2B:
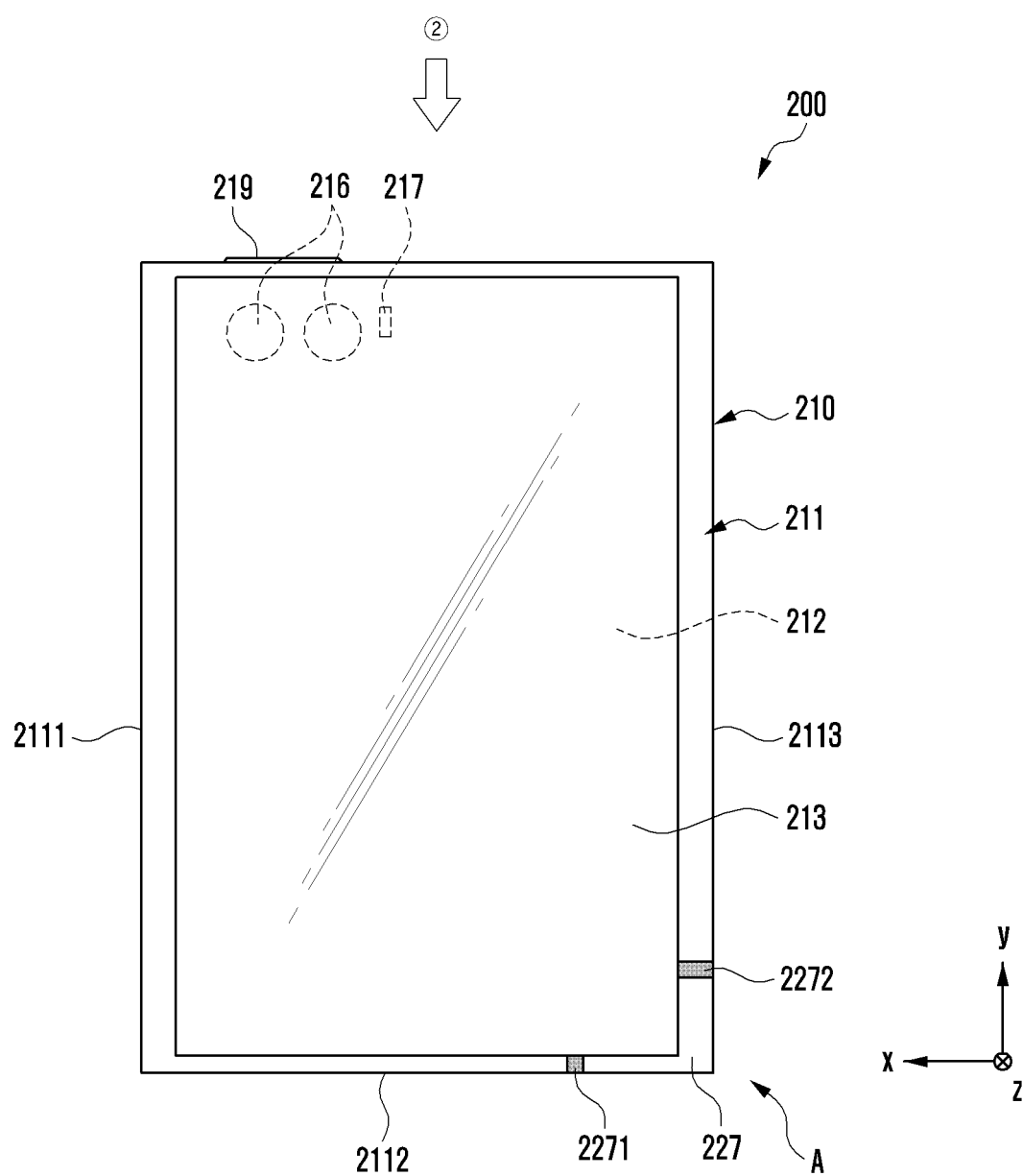

FIGS. 2A and 2B are diagrams illustrating the front and rear surfaces of an electronic device in a slide-in state according to various embodiments of the disclosure.

Figure 3A:
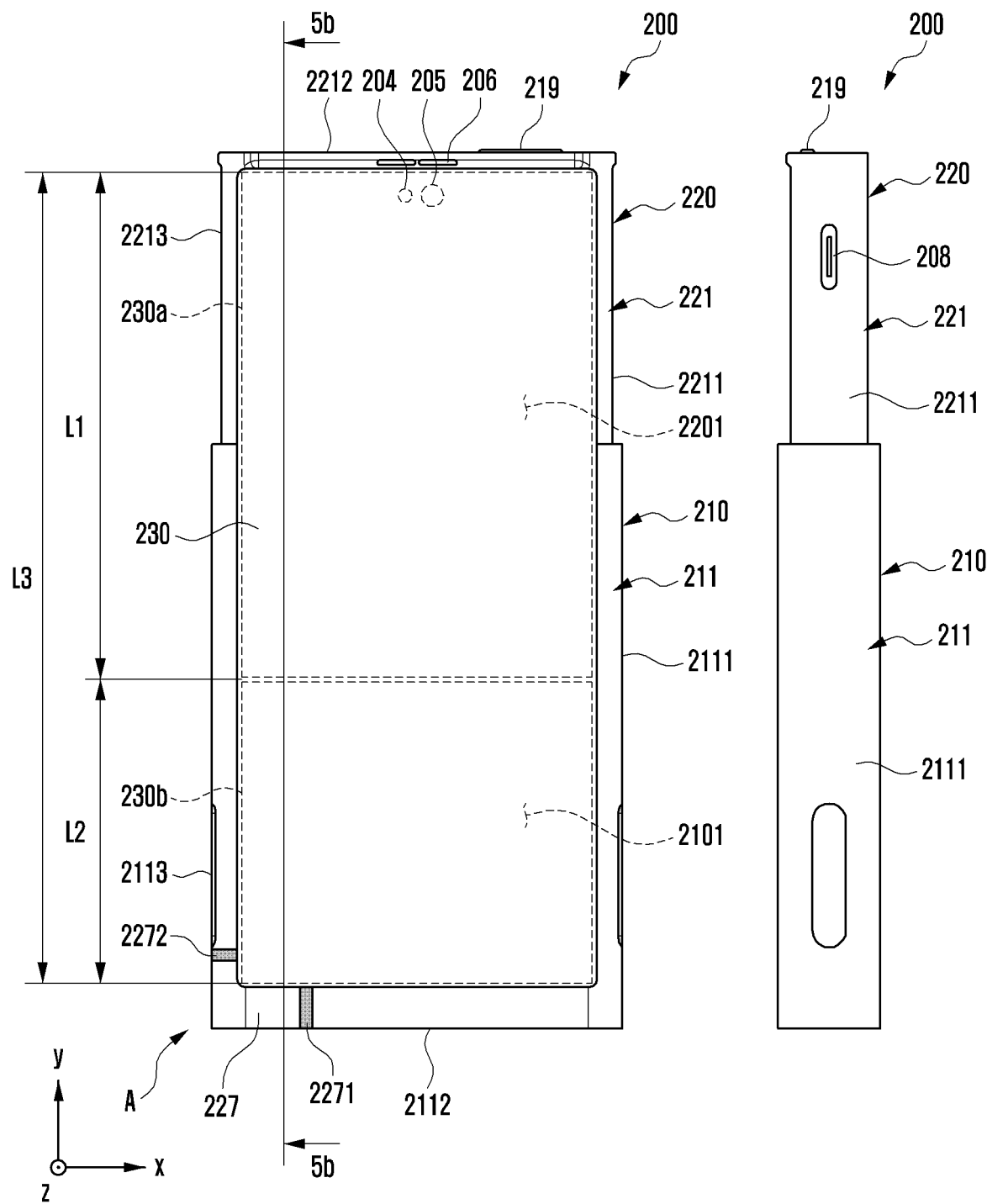
FIGS. 3A and 3B are diagrams illustrating the front and rear surfaces of an electronic device in a slide-out state according to various embodiments of the disclosure.
Figure 3B:
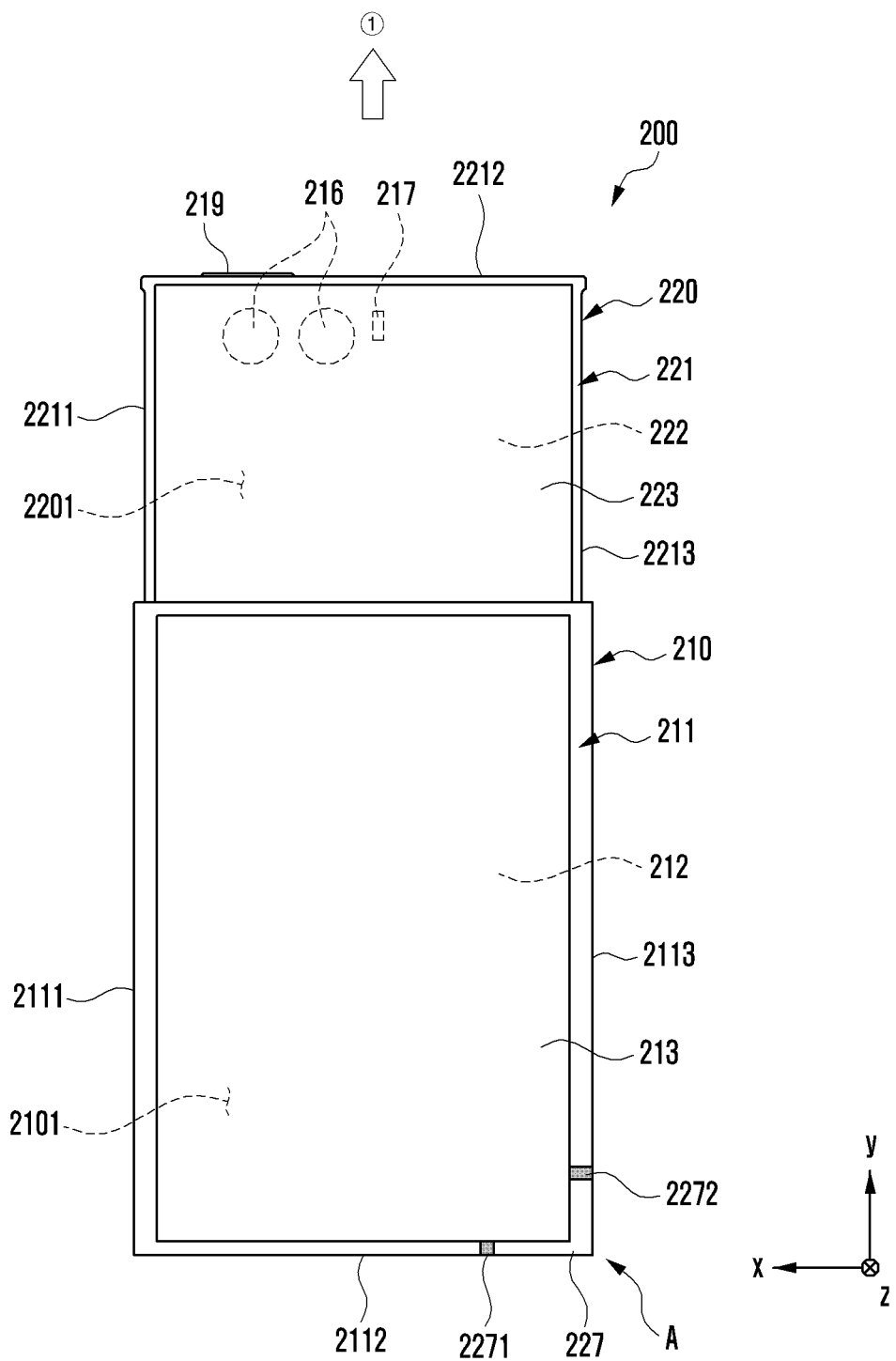

FIGS. 3A and 3B are diagrams illustrating the front and rear surfaces of an electronic device in a slide-out state according to various embodiments of the disclosure.

The electronic device 200 in FIGS. 2A, 2B, 3A, and 3B may refer to the electronic device 101 in FIG. 1 or may be similar, at least in part, to the electronic device 101 in FIG. 1.

Referring to FIGS. 2A, 2B, 3A, and 3B, the electronic device 200 may include a fixed housing 210, a movable housing 220 coupled to be slidable in a designated direction (e.g., direction $\hat{1}$ or direction $\hat{2}$) (e.g., the positive/negative y-axis directions) from the fixed housing 210, and a rollable display 230 (e.g., a flexible display, an expandable display, or a stretchable display) disposed to be supported by at least some of the fixed housing 210 and the movable housing 220.

According to an embodiment, the electronic device 200 may be configured such that the movable housing 220 allows slide-out in a first direction (direction $\hat{1}$) or slide-in in a second direction (direction $\hat{2}$) opposite to the first direction (direction $\hat{1}$), based on the fixed housing 210 gripped by the user. According to an embodiment, in the slide-in state, at least a portion of the movable housing 220 having a second space 2201 may be accommodated in a first space 2101 of the fixed housing 210. According to an embodiment, the electronic device 200 may include a support member (e.g., a support member 240 in FIG. 5A) (e.g., a bendable member, an articulated hinge module, or a multi-bar assembly) that at least partially forms the same plane as at least a portion of the movable housing 220 in the slide-out state and is at least partially accommodated in the first space 2101 of the fixed housing 210 in the slide-in state. According to an embodiment, in the slide-in state, at least a portion of the rollable display 230 may be disposed to be invisible from the outside by being accommodated in the first space 2101 of the fixed housing 210 in a bent manner while being supported by the support member (e.g., the support member 240 in FIG. 5A). According to an embodiment, in the slide-out state, at least a portion of the rollable display 230 may be disposed to be visible from the outside while being supported by the support member (e.g., the support member 240 in FIG. 5A) that at least partially forms the same plane as the movable housing 220.

According to an embodiment, the electronic device 200 may include the fixed housing 210 including a first lateral member 211 and the movable housing 220 including a second lateral member 221. According to an embodiment, the first lateral member 211 may include a first side surface 2111 having a first length along a first direction (e.g., the y-axis direction), a second side surface 2112 extending to have a second length smaller than the first length along a direction (e.g., the x-axis direction) substantially perpendicular to the first side surface 2111, and a third side surface 2113 extending substantially parallel to the first side surface 2111 from the second side surface 2112 and having the first length.

According to an embodiment, the first lateral member 211 may be at least partially formed of a conductive member (e.g., metal).

In an embodiment, the first lateral member 211 may be formed by a combination of a conductive member and a non-conductive member (e.g., polymer).

According to an embodiment, the fixed housing 210 may include a first extension member 212 extending from at least a portion of the first lateral member 211 to at least a portion of the first space 2101.

According to an embodiment, the first extension member 212 may be integrally formed with the first lateral member 211.

In an embodiment, the first extension member 212 may be separately formed from the first lateral member 211 and structurally combined with the first lateral member 211.

According to an embodiment, the second lateral member 221 may include a fourth side surface 2211 at least partially corresponding to the first side surface 2111 and having a third length, a fifth side surface 2212 extending in a direction substantially parallel to the second side surface 2112 from the fourth side surface 2211 and having a fourth length smaller than the third length, and a sixth side surface 2213 extending from the fifth side surface 2212 to correspond to the third side surface 2113 and having the third length.

According to an embodiment, the second lateral member 221 may be at least partially formed of a conductive member (e.g., metal).

In an embodiment, the second lateral member 221 may be formed by a combination of a conductive member and a non-conductive member (e.g., polymer).

According to an embodiment, at least a portion of the second lateral member 221 may include a second extension member 222 extending to at least a portion of the second space 2201 of the movable housing 220.

According to an embodiment, the second extension member 222 may be integrally formed with the second lateral member 221.

In an embodiment, the second extension member 222 may be separately formed from the second lateral member 221 and structurally combined with the second lateral member 221.

According to various embodiments, the first side surface 2111 and the fourth side surface 2211 may be slidably coupled to each other.

According to an embodiment, the third side surface 2113 and the sixth side surface 2213 may be slidably coupled to each other.

According to an embodiment, in the slide-in state, the fourth side surface 2211 overlaps with the first side surface 2111, so that it may be disposed to be substantially invisible from the outside.

According to an embodiment, in the slide-in state, the sixth side surface 2213 overlaps with the third side surface 2113, so that it may be disposed to be substantially invisible from the outside.

In an embodiment, in the slide-in state, at least a portion of the fourth and sixth side surfaces 2211 and 2213 may be disposed to be at least partially visible from the outside. According to an embodiment, in the slide-in state, the second extension member 222 overlaps with the first extension member 212, so that it may be disposed to be substantially invisible from the outside.

According to an embodiment, the fixed housing 210 may include a first rear cover 213 coupled to at least a portion of the first lateral member 211.

According to an embodiment, the first rear cover 213 may be disposed in a manner coupled with at least a portion of the first extension member 212.

In an embodiment, the first rear cover 213 may be integrally formed with the first lateral member 211.

According to an embodiment, the first rear cover 213 may be formed of polymer, coated or tinted glass, ceramic, metal (e.g., aluminum, stainless steel (STS), or magnesium), or a combination of at least two of these materials.

In an embodiment, the first rear cover 213 may extend to at least a portion of the first lateral member 211. In an embodiment, at least a portion of the first extension member 212 may be replaced with the first rear cover 213.

According to an embodiment, the movable housing 220 may include a second rear cover 223 coupled to at least a portion of the second lateral member 221.

According to an embodiment, the second rear cover 223 may be disposed in a manner coupled with at least a portion of the second extension member 222.

In an embodiment, the second rear cover 223 may be integrally formed with the second lateral member 221.

According to an embodiment, the second rear cover 223 may be formed of polymer, coated or tinted glass, ceramic, metal (e.g., aluminum, stainless steel (STS), or magnesium), or a combination of at least two of these materials.

In an embodiment, the second rear cover 223 may extend to at least a portion of the second lateral member 221. In an embodiment, at least a portion of the second extension member 222 may be replaced with the second rear cover 223.

According to various embodiments, the electronic device 200 may include the rollable display 230 disposed to be supported by at least a portion of the fixed housing 210 and the movable housing 220.

According to an embodiment, the rollable display 230 may include a first portion 230a (e.g., a flat portion) that is always visible from the outside, and a second portion 230b (e.g., a bendable portion) that extends from the first portion 230a and is at least partially accommodated in the first space 2101 of the fixed housing 210 so as not to be visible from the outside in the slide-in state.

Figure 5A:
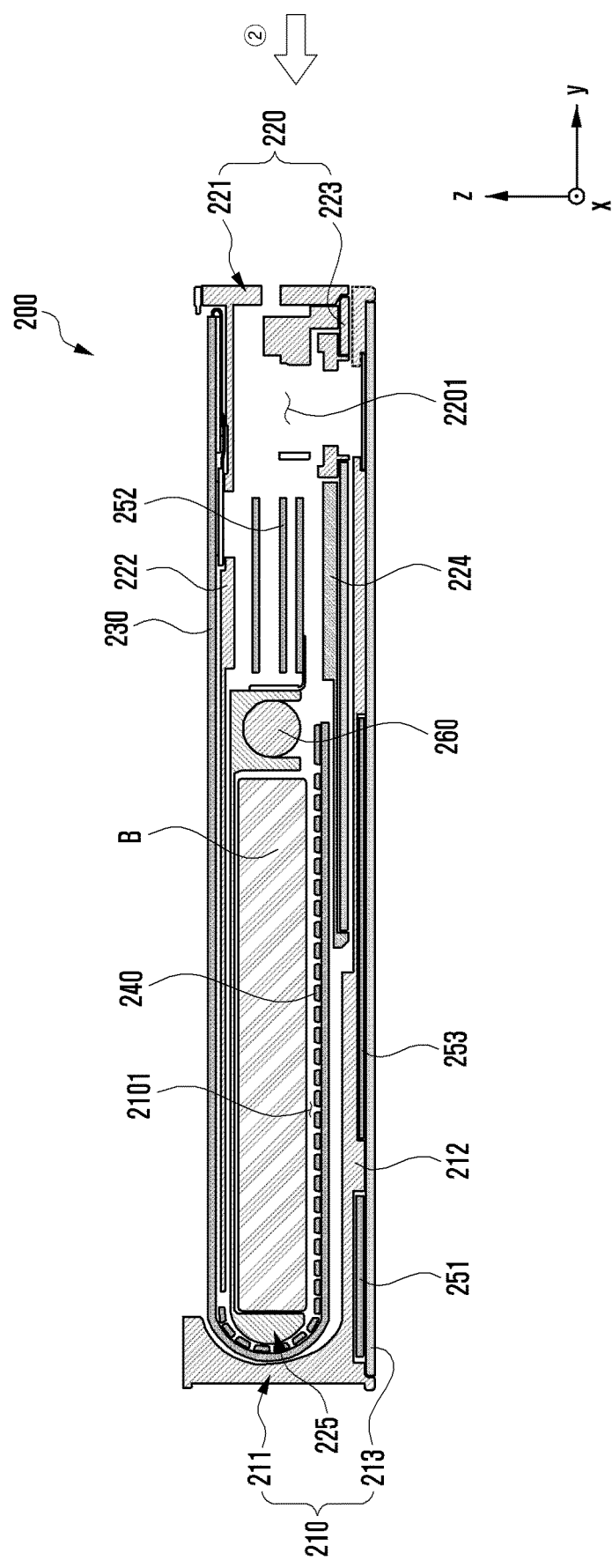
FIGS. 5A and 5B are cross-sectional views of an electronic device taken along line 5a-5a of FIG. 2A and line 5b-5b of FIG. 3A according to various embodiments of the disclosure.

According to an embodiment, the first portion 230a may be disposed to be supported by the movable housing 220, and the second portion 230b may be disposed to be at least partially supported by the support member (e.g., the support member 240 in FIG. 5A).

According to an embodiment, the second portion 230b of the rollable display 230 may be disposed to extend from the first portion 230a, to form substantially the same plane as the first portion 230a, and to be visible from the outside while being supported by the support member (e.g., the support member 240 in FIG. 5A) in a state where the movable housing 220 slides out along the first direction (direction $\hat{1}$).

According to an embodiment, the second portion 230b of the rollable display 230 may be disposed to be accommodated in the first space 2101 of the fixed housing 210 in a bent manner and to be invisible from the outside in a state where the movable housing 220 slides in along the second direction (direction $\hat{2}$). Therefore, in the electronic device 200, a display area of the rollable display 230 may vary as the movable housing 220 moves from the fixed housing 210 along a designated direction (e.g., the positive or negative y-axis direction) in a sliding manner.

According to an embodiment, the length of the rollable display 230 in the first direction (direction $\hat{1}$) may vary depending on the sliding movement of the movable housing 220 which moves relative to the fixed housing 210. For example, in the slide-in state, the rollable display 230 may have a first display area (e.g., an area corresponding to the first portion 230a) corresponding to a first length L1.

According to an embodiment, in the slide-out state, the rollable display 230 may be extended to have a third display area (e.g., an area including the first portion 230a and the second portion 230b) larger than the first display area and corresponding to a third length L3 greater than the first length L1, responding to the sliding movement of the movable housing 220 which additionally moves by a second length L2 based on the fixed housing 210.

According to an embodiment, the electronic device 200 may include at least one of an input device (e.g., a microphone 203-1) disposed in the second space 2201 of the movable housing 220, an audio output device (e.g., a call receiver 206 and/or a speaker 207), sensor modules 204 and 217, a camera module (e.g., a first camera module 205 or a second camera module 216), a connector port 208, socket module 218, a key input device 219, or an indicator (not shown).

According to an embodiment, the electronic device 200 may include another input device (e.g., a microphone 203) disposed in the fixed housing 210.

In an embodiment, the electronic device 200 may be configured such that at least one of the above-described components is omitted or any other component is further included.

In an embodiment, at least one of the above-described components may be disposed in the first space 2101 of the fixed housing 210.

According to various embodiments, the input device may include the microphone 203-1. In some embodiments, the input device (e.g., the microphone 203-1) may include a plurality of microphones disposed to detect the direction of sound. The audio output device may include, for example, the call receiver 206 and the speaker 207.

According to an embodiment, the speaker 207 may communicate with the outside through at least one speaker hole formed in the movable housing 220 at a position (e.g., the fifth side surface 2212) always exposed to the outside regardless of the slide-in/slide-out state.

According to an embodiment, in the slide-out state, the connector port 208 may communicate with the outside through a connector port hole formed in the movable housing 220.

In an embodiment, in the slide-in state, the connector port 208 may communicate with the outside through an opening formed in the fixed housing 210 to correspond to the connector port hole.

In an embodiment, the call receiver 206 may include a speaker (e.g., a piezo speaker) that operates without a separate speaker hole.

According to an embodiment, the sensor modules 204 and 217 may generate electrical signals or data values corresponding to an internal operating state of the electronic device 200 or an external environmental state. The sensor modules 204 and 217 may include, for example, a first sensor module 204 (e.g., a proximity sensor or an illuminance sensor) disposed in the front of the electronic device 200 and/or a second sensor module 217 (e.g., a heart rate monitoring (HRM) sensor) disposed in the rear of the electronic device 200.

According to an embodiment, the first sensor module 204 may be disposed below the rollable display 230 in the front of the electronic device 200.

According to an embodiment, the first sensor module 204 and/or the second sensor module 217 may include at least one of a proximity sensor, an illuminance sensor, a time of flight (TOF) sensor, an ultrasonic sensor, a fingerprint recognition sensor, a gesture sensor, a gyro sensor, an air pressure sensor, a magnetic sensor, an acceleration sensor, a grip sensor, a color sensor, an infrared (IR) sensor, a biometric sensor, a temperature sensor, or a humidity sensor.

According to an embodiment, the camera module may include a first camera module 205 disposed in the front of the electronic device 200 and a second camera module 216 disposed in the rear of the electronic device 200.

According to an embodiment, the electronic device 200 may include a flash (not shown) located near the second camera module 216.

According to an embodiment, the camera modules 205 and 216 may include one or a plurality of lenses, an image sensor, and/or an image signal processor.

According to an embodiment, the first camera module 205 may be disposed below the rollable display 230 and configured to capture a subject through a part of an active area (e.g., the display area) of the rollable display 230.

According to an embodiment, the first camera module 205 among the camera modules and the first sensor module 204 among the sensor modules 204 and 217 may be disposed to detect an external environment through the rollable display 230. For example, the first camera module 205 or the first sensor module 204 may be disposed to communicate with an external environment through a transmissive region or a perforated opening formed in the rollable display 230 in the second space 2201 of the movable housing 220.

According to an embodiment, the region of the rollable display 230 facing the first camera module 205 is a part of the display area for displaying contents and may be formed as a transmissive region having a designated transmittance.

According to an embodiment, the transmissive region may be formed to have a transmittance ranging from about 5% to about 20%. The transmissive region may include an area overlapping with an effective area (e.g., an angle of view area) of the first camera module 205 through which light passes to generate an image in an image sensor. For example, the transmissive region of the rollable display 230 may include an area in which a pixel arrangement density and/or wiring density is lower than a surrounding area. For example, the transmissive region may replace the aforementioned opening. For example, the first camera module 205 may include an under display camera (UDC).

In an embodiment, the first sensor module 204 may be disposed to perform its function without being visually exposed through the rollable display 230 in the internal space of the electronic device 200.

According to an embodiment, the electronic device 200 may include at least one antenna element (e.g., one antenna element 224*b* in FIG. 4) electrically connected to a wireless communication circuit (e.g., the wireless communication module 192 in FIG. 1) disposed in the movable housing 220.

According to an embodiment, the electronic device 200 may include a bezel antenna A disposed through the conductive first lateral member 211 of the fixed housing 210. For example, the bezel antenna A may include a conductive portion 227, which is disposed on at least a portion of the second and third side surfaces 2112 and 2113 of the first lateral member 211 and electrically isolated by segmental portions 2271 and 2272 formed of a non-conductive material (e.g., polymer).

According to an embodiment, the wireless communication circuit (e.g., the wireless communication module 192 in FIG. 1) may be configured to transmit or receive radio signals in at least one designated frequency band (e.g., about 600 MHz to 9000 MHz) (e.g., a legacy band or an NR band) through the conductive portion 227.

According to an embodiment, the electronic device 200 may include a side cover 2112*a* disposed on the second side surface 2112 to cover at least a part of the segmental portion 2271.

In an embodiment, the bezel antenna A may also be disposed on at least one of the first side surface 2111, the second side surface 2112, and the third side surface 2113.

In an embodiment, the bezel antenna A may also be disposed on at least one of the fourth side surface 2211, the fifth side surface 2212, and the sixth side surface 2213 of the movable housing 220.

In an embodiment, the electronic device 200 may further include at least one antenna module (e.g., a 5G antenna module or antenna structure), which is disposed in the internal space (e.g., the second space 2201 or the first space 2101) to transmit or receive radio signals in a frequency band ranging from about 3 GHz to 100 GHz through another wireless communication circuit (e.g., the wireless communication module 192 in FIG. 1).

In an embodiment, the wireless communications circuit may also be disposed in the fixed housing 210.

According to an embodiment, a slide-in/slide-out operation of the electronic device 200 may be automatically performed. For example, the slide-in/slide-out operation of the electronic device 200 may be performed through a driving motor (e.g., a driving motor 260 in FIG. 4) including a pinion gear (e.g., a pinion gear 261 in FIG. 4) disposed in the first space 2101 of the fixed housing 210, and a rack gear (e.g., a rack gear 2221 in FIG. 4) gear-coupled with the pinion gear 261 and disposed in the second space 2201 of the movable housing 220. For example, upon detecting a triggering operation for changing from the slide-in state to the slide-out state or from the slide-out state to the slide-in state, a processor (e.g., the processor 120 in FIG. 1) of the electronic device 200 may operate the driving motor (e.g., the driving motor 260 in FIG. 4) disposed inside the electronic device 200.

According to an embodiment, the triggering operation may include selecting (e.g., touching) an object displayed on the rollable display 230 or manipulating a physical button (e.g., a key button) included in the electronic device 200.

The electronic device 200 according to embodiments of the disclosure includes the driving motor (e.g., the driving motor 260 in FIG. 4) disposed at an end in the first space 2101 of the fixed housing 210, closest to the second space 2201 of the movable housing 220 in the slide-out direction (direction 1̂), and has an electrical connection structure electrically connected to a second printed circuit board (e.g., a second printed circuit board 252 in FIG. 4) disposed in the second space 2201 through a flexible printed circuit board (e.g., a flexible printed circuit board F1 in FIG. 8A), thereby helping to minimize the electrical connection structure between the second printed circuit board 252 and the driving motor 260 disposed in the different housings 210 and 220, respectively, and thus improve operational reliability.

According to an embodiment, the electronic device 200 includes a battery (e.g., a battery B in FIG. 4) disposed in the first space 2101 of the fixed housing 210 to support at least a portion of the rollable display 230 in the slide-out state, thereby helping to improve the operation reliability of the electronic device 200.

According to an embodiment, the electronic device 200 includes the driving motor 260 and the battery B disposed in the first space 2101 of the fixed housing 210, thereby realizing a relatively light weight of the movable housing 220, minimizing driving resistance, and allowing the sliding operation of the movable housing 220 with minimal power consumption.

Figure 4:
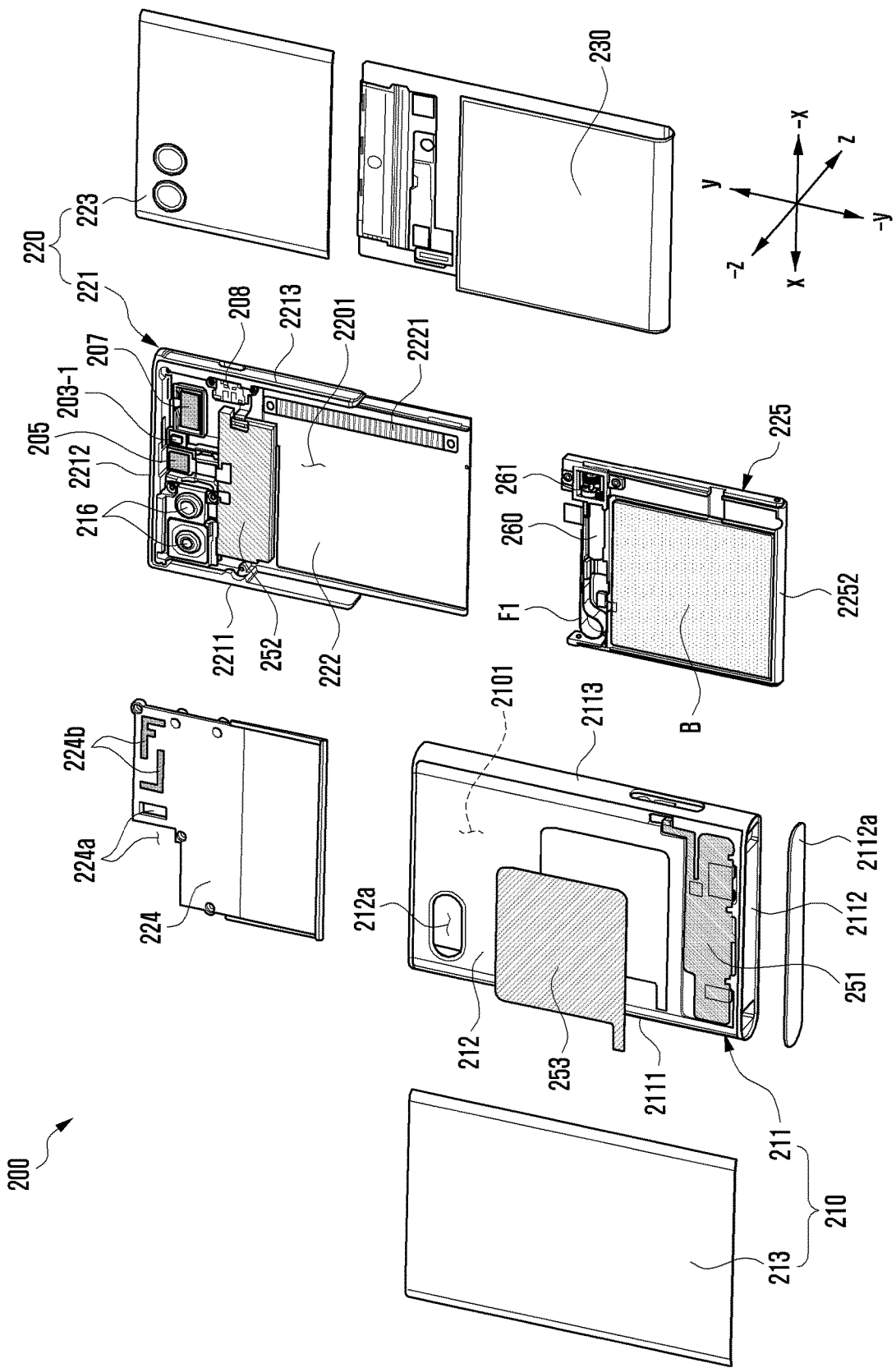
FIG. 4 is an exploded perspective view of an electronic device according to an embodiment of the disclosure.

FIG. 4 is an exploded perspective view of an electronic device according to an embodiment of the disclosure.

In describing the electronic device 200 shown in FIG. 4, the same reference numerals are assigned to components substantially the same as those of the electronic device 200 shown in FIGS. 2A, 2B, 3A, and 3B, and thus detailed descriptions thereof may be omitted.

Referring to FIG. 4, the electronic device 200 may include the fixed housing 210 having the first space 2101, the movable housing 220 slidably coupled to the fixed housing 210 and having the second space (e.g., the second space 2201 in FIG. 3A), the support member (e.g., a support member 240 in FIG. 5A) rotatably disposed in a manner that is at least partially bent in the second space 2201, the rollable display 230 disposed to be supported by at least a portion of the support member 240 and the movable housing 220, and a driving module for driving the movable housing 220 from the fixed housing 210 in a slide-in direction (e.g., the negative y-axis direction) and/or in a slide-out direction (e.g., the y-axis direction).

According to an embodiment, the fixed housing 210 may include the first lateral member 211 and the first rear cover 213 coupled to at least a portion of the first lateral member 211 (e.g., at least a portion of the first extension member 212).

According to an embodiment, the movable housing 220 may include the second lateral member 221 and the second rear cover 223 coupled to at least a portion of the second lateral member 221.

According to an embodiment, the driving module may include the driving motor 260 disposed in the first space 2101 and including the pinion gear, and the rack gear 2221 disposed to be gear-coupled with the pinion gear 261 in the second space 2201.

According to an embodiment, the driving module may further include a speed reduction module including a plurality of gear assemblies arranged to reduce the rotational speed and increase the driving force by being coupled with the driving motor 260.

According to an embodiment, the driving motor 260 may be disposed to be supported through at least a portion of a support bracket 225 disposed in the first space 2101 of the fixed housing 210.

According to an embodiment, the driving motor 260 may be fixed to the end (e.g., edge) of the support bracket 225 in the first space 2101 in the slide-out direction (e.g., the y-axis direction).

According to an embodiment, the electronic device 200 may include at least one electronic component disposed in the second space 2201.

According to an embodiment, the at least one electronic component may include a first printed circuit board 251 disposed in the fixed housing 210 and a second printed circuit board 252 disposed in the movable housing.

According to an embodiment, the at least one electronic component may include a second camera module 216, a speaker 207, a connector port 208, and a microphone 203-1, which are disposed near the second printed circuit board 252 in the second space 2201.

According to an embodiment, because the at least one electronic component is disposed near the second printed circuit board 252 in the second space 2201 of the movable housing 220, efficient electrical connection may be possible.

According to various embodiments, the electronic device 200 may include a rear bracket 224 disposed to cover at least some of a plurality of electronic components disposed between the second extension member 222 and the second rear cover 223 in the movable housing 220.

According to an embodiment, the rear bracket 224 may be structurally coupled to at least a portion of the second extension member 222.

In an embodiment, the rear bracket 224 may be omitted.

According to an embodiment, the rear bracket 224 may be disposed to cover at least one electronic component and support the second rear cover 223. According to an embodiment, the rear bracket 224 may have a notch 224a or an opening 224a (e.g., a through hole) formed at a position corresponding to the second camera module 216 and/or the sensor module (e.g., the second sensor module 217 in FIG. 3B).

According to an embodiment, the rear bracket 224 may include at least one antenna element 224b.

According to an embodiment, the at least one antenna element 224b may be disposed on the outer surface of the rear bracket 224 when the rear bracket 224 is formed of a dielectric injection-molding material (e.g., an antenna carrier).

According to an embodiment, the at least one antenna element 224b may have a laser direct structuring (LDS) antenna pattern formed on the outer surface of the rear bracket 224.

In an embodiment, the at least one antenna element 224b may have a conductive plate attached to the outer surface of the rear bracket 224 or a conductive paint or conductive pattern formed on the outer surface.

In an embodiment, the at least one antenna element 224b may be disposed in a built-in manner when the rear bracket 224 is injection-molded.

According to an embodiment, the at least one antenna element 224b may be configured to transmit or receive radio signals in a designated frequency band (e.g., legacy band) by being electrically connected to a wireless communication circuit (e.g., the wireless communication module 192 in FIG. 1) disposed on the first printed circuit board 251.

According to an embodiment, the second camera module 216 and/or the second sensor module 217 may be disposed to detect an external environment through the notch 224a or the opening 224a.

According to an embodiment, the second rear cover 223 may be transparently treated in a region at least corresponding to the second camera module 216 and/or the second sensor module 217.

In an embodiment, the second camera module 216 and/or the second sensor module 217 may be configured to operate only when the electronic device 200 is in the slide-out state.

According to an embodiment, the electronic device 200 may include the support bracket 225 disposed in the first space 2101 of the fixed housing 210.

According to an embodiment, the support bracket 225 may include a support portion 2252 disposed at one end thereof and having a curved outer surface to support the rear surface of the support member 240 that is bent during the sliding operation.

According to an embodiment, the support bracket 225 may include a support structure for supporting and fixing the driving motor 260.

According to an embodiment, the driving motor 260 may be disposed at the end (e.g., edge) of the support bracket 225 in the slide-out direction (e.g., the y-axis direction). For example, when the assembly of the electronic device 200 is completed, the driving motor 260 is disposed closest to the second printed circuit board 252 among the electronic components disposed in the fixed housing 210, so that it is possible to minimize the size and/or length of the flexible printed circuit board F1 electrically connecting the second printed circuit board 252 and the driving motor 260.

According to an embodiment, the electronic device 200 may include a pair of guide rails disposed on both sides of the support bracket 225 to guide both ends of the support member 240 in a sliding direction.

According to an embodiment, the fixed housing 210 may have an opening 212a (e.g., a through hole) disposed, in the first extension member 212, at a position corresponding to the second camera module 216 and/or the second sensor module 217 disposed in the movable housing 220 when the electronic device 200 is in the slide-in state.

According to an embodiment, the second camera module 216 and/or the second sensor module 217 may detect an external environment through the opening 212a formed in the fixed housing 210 when the electronic device 200 is in the slide-in state. In this case, a region of the first rear cover 213 at least corresponding to the second camera module 216 and/or the second sensor module 217 may be treated transparently.

According to an embodiment, the electronic device 200 may include the first printed circuit board 251 and an antenna member 253 disposed between the first extension member 212 and the first rear cover 213 in the fixed housing 210.

According to an embodiment, the first printed circuit board 251 and the antenna member 253 may be disposed on at least a portion of the first extension member 212.

According to an embodiment, the first printed circuit board 251 and the antenna member 253 may be electrically connected to the second printed circuit board 252 through at least one flexible printed circuit board (FPCB or a flexible RF cable (FRC)).

According to an embodiment, the antenna member 253 may include a multi-function coil or multi-function core (MFC) antenna for performing a wireless charging function, a near field communication (NFC) function, and/or an electronic payment function.

In an embodiment, the antenna member 253 is electrically connected to the first printed circuit board 251, thereby being electrically connected to the second printed circuit board 252 through the first printed circuit board 251.

In an embodiment, the first printed circuit board 251 and/or the antenna member 253 may also be electrically connected to the second printed circuit board 252 through at least a portion of the flexible printed circuit board F1 connecting the driving motor 260 and the second printed circuit board 252.

FIG. 5A is a cross-sectional view of an electronic device taken along line 5a-5a of FIG. 2A according to an embodiment of the disclosure.

Figure 5B:
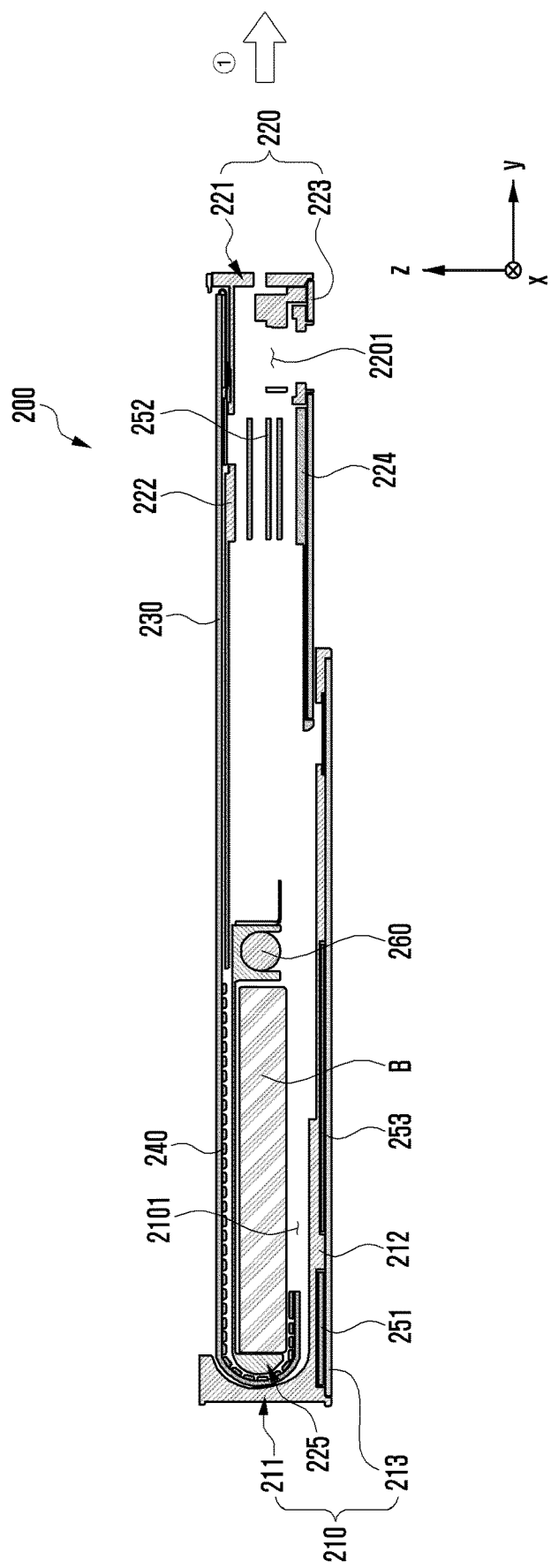

FIG. 5B is a cross-sectional view of an electronic device taken along line 5b-5b of FIG. 3A according to an embodiment of the disclosure.

In describing the electronic device shown in FIGS. 5A and 5B, the same reference numerals are assigned to components substantially the same as those of the electronic device 200 shown in FIG. 4, and thus detailed descriptions thereof may be omitted.

Referring to FIGS. 5A and 5B, the electronic device 200 may include the fixed housing 210 having the first space 2101, the movable housing 220 having the second space 2201, the support member 240 connected to the fixed housing 210 and accommodated in a manner that is at least partially bent in the first space 2101 in the slide-in state, the rollable display 230 disposed to be supported by at least a portion of the support member 240 and at least a portion of the movable housing 220, and the driving motor 260 disposed in the first space 2101 and including the pinion gear gear-coupled with the rack gear (e.g., the rack gear 2221 in FIG. 4) of the second space 2201.

According to an embodiment, the driving motor 260 can automatically move the movable housing 220 in the slide-in direction (direction $\hat{2}$) or the slide-out direction (direction $\hat{1}$) based on the fixed housing 210.

According to an embodiment, the movable housing 220 may be at least partially accommodated in the first space 2101 of the fixed housing 210 in the slide-in state of the electronic device 200 (the state of FIG. 5A).

According to an embodiment, the first extension member 212 is slidably coupled and can be guided by the support bracket 225 disposed in the second space 2201. In this case, at least a portion of the rollable display 230 is accommodated in the second space 2201 along with the support member 240, thereby being disposed to be invisible from the outside. In this case, the first display area of the rollable display 230 may be exposed to the outside.

According to an embodiment, through driving of the driving motor 260, the movable housing 220 can transition along the first direction (direction $\hat{1}$) to the slide-out state in which it is at least partially exposed to the outside of the fixed housing 210.

According to an embodiment, in the slide-out state of the electronic device 200 (the state of FIG. 5B), a portion of the rollable display 230 in the second space 2201 can move together with the support member 240 while being supported by the support bracket 225, thereby being at least partially exposed to the outside. In this case, the second display area of the rollable display 230, greater than the first display area, may be exposed to the outside.

According to an embodiment, the driving motor 260 is located at the end of the support bracket 225 disposed in the first space 2101 of the fixed housing 210 in the slide-out direction (direction $\hat{1}$) (e.g., the y-axis direction), so that it can approach the second printed circuit board 252 disposed in the second space 2201 of the movable housing 220 at the closest distance.

According to an embodiment, such a proximity arrangement structure between the driving motor 260 and the second printed circuit board 252 minimizes the length and volume of the flexible printed circuit board (e.g., the flexible printed circuit board F1 in FIG. 5A) electrically connecting them, thereby helping to improve the operational reliability of the electronic device 200.

Figure 6A:
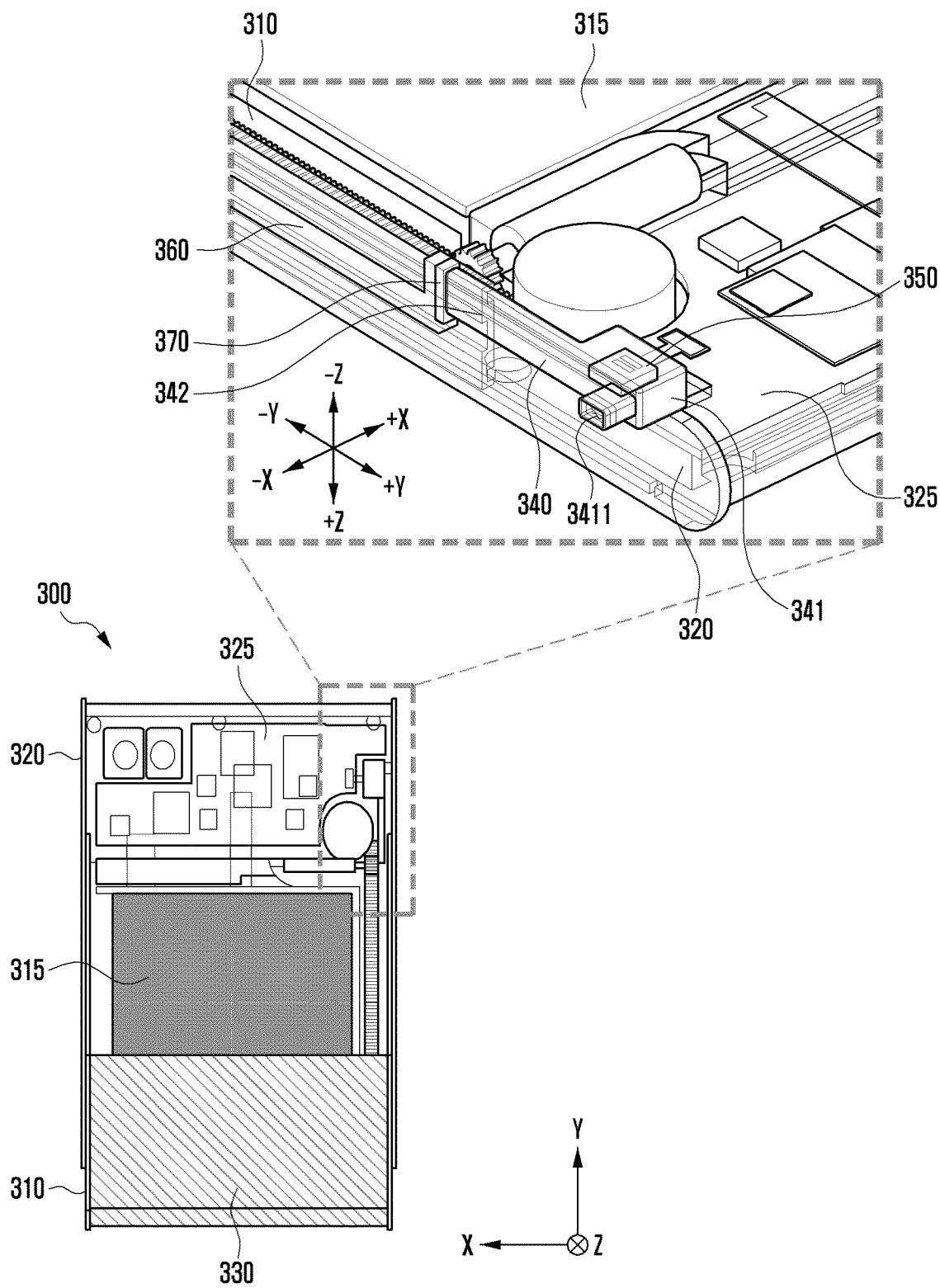
FIGS. 6A and 6B are diagrams illustrating a pipeline and an opening and closing member of an electronic device according to various embodiments of the disclosure.
Figure 6B:
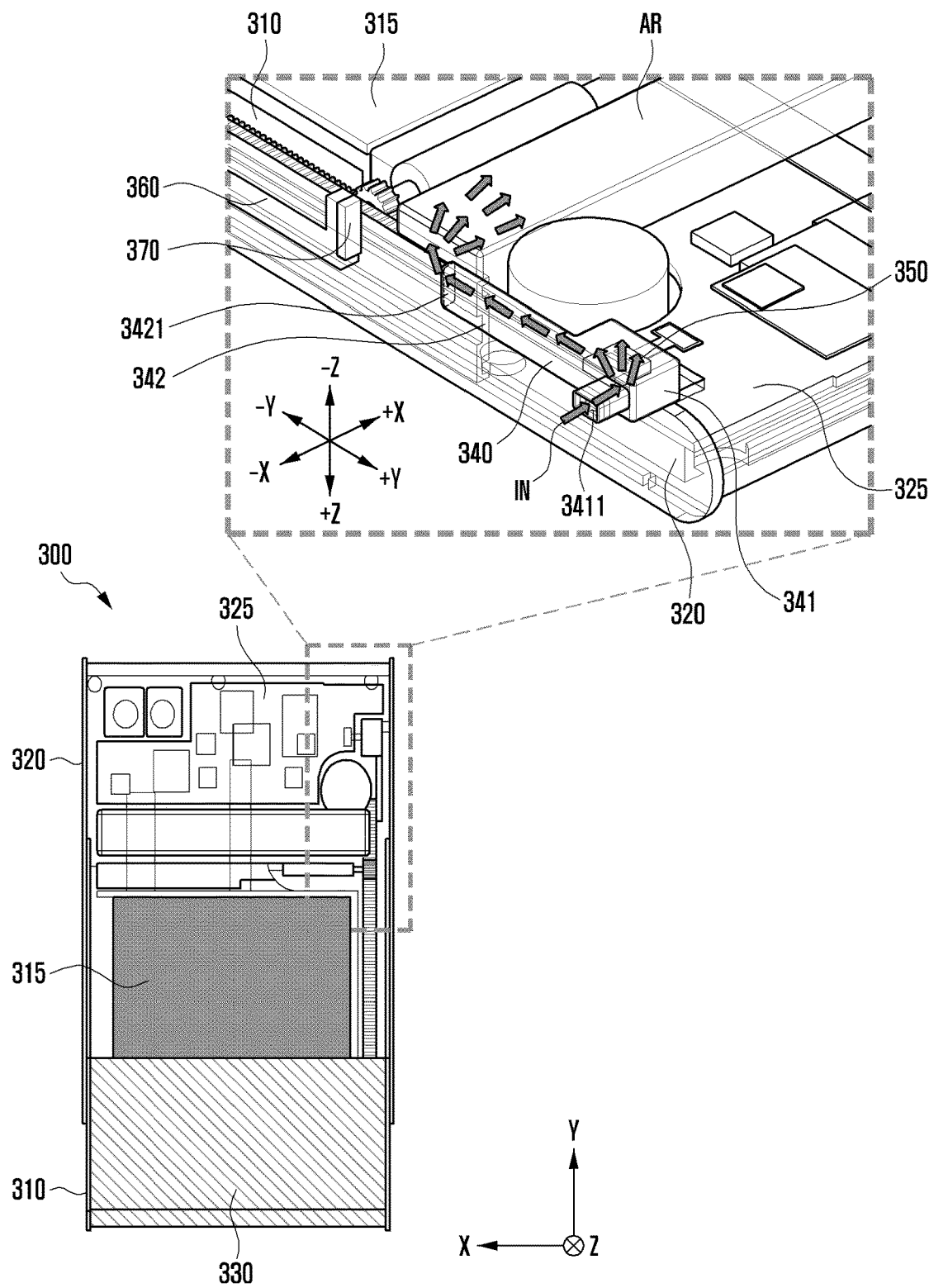

FIGS. 6A and 6B are diagrams illustrating a pipeline and an opening and closing member of an electronic device according to various embodiments of the disclosure.

FIG. 6A is a diagram illustrating a pipeline 340 and an opening and closing member 360 in the slide-in state of an electronic device 300 according to an embodiment of the disclosure.

FIG. 6B is a diagram illustrating a pipeline 340 and an opening and closing member 360 in the slide-out state according to an embodiment of the disclosure.

In an embodiment, the electronic device 300 may refer to or include at least in part the electronic device 200 shown in FIG. 2A.

In describing the electronic device 300 according to an embodiment of the disclosure, the width direction of the electronic device 300 refers to the x-axis direction, and the length direction of the electronic device 300 refers to the y-axis direction. The height direction of the electronic device 300 refers to the z-axis direction.

The electronic device 300 according to an embodiment of the disclosure may include a first housing 310, a second housing 320, a battery 315, a printed circuit board 325, a rollable display 330, a pipeline 340, an air sensor 350, an opening and closing member 360, and/or an elastic member 370.

In an embodiment, the first housing 310 may include the fixed housing 210 and/or the support bracket 225 shown in FIG. 4. For example, the first housing 310 may include the first lateral member 211 (see FIG. 4), the first rear cover 213 (see FIG. 4), and/or the support bracket 225 (see FIG. 4). In addition, the battery 315 and/or the driving motor 260 (see FIG. 4) may be disposed in at least a portion of the first housing 310.

In an embodiment, the second housing 320 may include the movable housing 220 and/or the rear bracket 224 shown in FIG. 4. For example, the second housing 320 may include the second lateral member 221 (see FIG. 4), the second rear cover 223 (see FIG. 4), and/or the rear bracket 224 (see FIG. 4). In addition, the printed circuit board 325 and/or the second camera module 216 (see FIG. 4) may be disposed in at least a portion of the second housing 320.

In an embodiment, the rollable display 330 may refer to or include at least in part the rollable display 230 shown in FIG. 4.

In an embodiment, the rollable display 330 may be disposed in at least a portion of the first and second housings 310 and 320. The rollable display 330 may have the display area exposed to the outside, which increases or decreases depending on the sliding movement of the second housing 320 relative to the first housing 310.

In an embodiment, the battery 315 may refer to or include at least in part the battery B shown in FIG. 4. The battery 315 according to an embodiment may be disposed in the first housing 310.

In an embodiment, the printed circuit board 325 may refer to or include at least in part the second printed circuit board 252 shown in FIG. 4. The printed circuit board 325 according to an embodiment may be disposed in the second housing 320.

In an embodiment, the pipeline 340 may be disposed in one side of the second housing 320. For example, the pipeline 340 may be disposed at a position relatively close to one side surface of the second housing 320 inside the second housing 320. The one side surface of the second housing 320 may refer to a side surface of the second housing 320 facing the negative x-axis direction.

In an embodiment, the pipeline 340 may include a sensing portion 341 and/or an extension portion 342.

In an embodiment, at least a portion of the air sensor 350 may be disposed inside the sensing portion 341. For example, one end of the air sensor 350 may be disposed inside the sensing portion 341 to directly contact the outside air, and the other end of the air sensor 350 may be disposed on one surface of the printed circuit board 325.

In an embodiment, the air sensor 350 may include a gas sensor and/or a fine dust sensor. For example, the air sensor 350 may include a gas sensor that detects a gas (e.g., $CO_2$, CO, NOx) contained in the gas. The gas sensor may be a sensor operated in an oxide semiconductor scheme, an electrochemical scheme, and/or an ion separation scheme. The air sensor 350 may include a fine dust sensor that detects fine dust contained in the gas. The fine dust sensor may be a sensor of a light scattering scheme.

In an embodiment, the sensing portion 341 may have a first opening 3411. An opening may also be formed on one side surface of the second housing 320 and may communicate with the first opening 3411. External air IN may be introduced into the electronic device 300 through the first opening 3411.

In an embodiment, the extension portion 342 may have a tubular shape connected to the sensing portion 341 and extending in a direction toward the first housing 310. The extension portion 342 may be formed to extend along the length direction (e.g., the y-axis direction) of the electronic device 300.

In an embodiment, one end of the extension portion 342 may refer to an end of the extension portion 342 toward the first housing 310. The other end of the extension portion 342 may refer to an end of the extension portion 342 toward the sensing portion 341.

In an embodiment, the extension portion 342 may have a second opening 3421 at one end thereof. In the slide-out state of the electronic device 300, the external air IN introduced into the first opening 3411 of the sensing portion 341 may flow into the electronic device 300 through the second opening 3421 of the extension portion 342.

In an embodiment, the other end of the extension portion 342 may be connected to the sensing portion 341.

In an embodiment, the width of the sensing portion 341 may be formed to be relatively greater than that of the extension portion 342. The width of the sensing portion 341 and the width of the extension portion 342 may refer to the lengths of the sensing portion 341 and the extension portion 342 extending in the width direction (e.g., the x-axis direction) of the electronic device 300. Because the sensing portion 341 has a relatively greater width, at least a portion of the air sensor 350 may be easily disposed in the sensing portion 341.

Referring to FIGS. 6A and 6B, the extension portion 342 is illustrated in the form of a tube having a tetragonal opening (e.g., the second opening 3421) and extended, and the shape of the opening of the extension portion 342 may not be limited thereto. The extension portion 342 may extend while having an opening of a shape other than a tetragonal opening. For example, the opening of the extension portion 342 may be formed in a circular shape or may be formed in a polygonal shape other than a tetragonal shape.

Referring to FIGS. 6A and 6B, the extension portion 342 is illustrated as extending in a straight line along a direction parallel to the length direction (e.g., the y-axis direction) of the electronic device 300, and the shape in which the extension portion 342 extends may not be limited thereto. The extension portion 342 may not extend in a straight line but be bent at least in part and extend toward an air region AR. For example, the extension portion 342 may extend along the length direction (e.g., the y-axis direction) of the electronic device 300, then bend at least in part, and extend toward the air region AR along the width direction (e.g., the x-axis direction) of the electronic device 300.

Referring to FIGS. 6A and 6B, the size of the opening (e.g., the second opening 3421) formed in the extension portion 342 is illustrated to be substantially unvaried along the direction in which the extension portion 342 extends (e.g., the y-axis direction), and the opening size of the extension portion 342 may not be limited thereto. For example, the size of the opening formed in the extension portion 342 may increase or decrease along the extension direction of the extension portion 342 (e.g., the y-axis direction).

In an embodiment, the size of the opening formed in the extension portion 342 may be increased and then decreased again along the extension direction of the extension portion 342 (e.g., the y-axis direction). For example, the size of the opening located between both ends of the extension portion 342 may be greater than the size of the opening formed at one end and the other end of the extension portion 342.

In an embodiment, the opening and closing member 360 may be disposed in the first housing 310. For example, the opening and closing member 360 may be disposed at a position relatively close to one side surface of the first housing 310 inside the first housing 310. The one side surface of the first housing 310 may refer to a side surface of the first housing 310 facing the negative x-axis direction.

In an embodiment, the opening and closing member 360 may be disposed to face the pipeline 340 at one end thereof (e.g., an end of the opening and closing member 360 toward the second housing 320). For example, the opening and closing member 360 may be disposed such that one end of the opening and closing member 360 faces the second opening 3421 of the extension portion 342 of the pipeline 340.

In an embodiment, the opening and closing member 360 may directly contact or be separated from the pipeline 340 depending on the sliding of the electronic device 300. For example, in the slide-in state of the electronic device 300, the opening and closing member 360 comes into contact with the extension portion 342 of the pipeline 340, so that the second opening 3421 of the extension portion 342 can be closed. In the slide-out state of the electronic device 300, the opening and closing member 360 is separated from the extension portion 342 of the pipeline 340, so that the second opening 3421 of the extension portion 342 can be opened.

In an embodiment, the elastic member 370 may be disposed at one end of the opening and closing member 360. For example, the elastic member 370 may be disposed at an end of the opening and closing member 360 toward the pipeline 340. The elastic member 370 may be disposed between the opening and closing member 360 and the pipeline 340.

In an embodiment, the elastic member 370 may has an elastic material. For example, the elastic member 370 may include a sponge or rubber having an elastic material. The length of the elastic member 370 (e.g., in the y-axis direction) may be increased or decreased by an external force.

Referring to FIG. 6A, the elastic member 370 may come into contact with the pipeline 340 in the slide-in state of the electronic device 300. The elastic member 370 of an elastic material may elastically change in length or width and serve to completely seal between the pipeline 340 and the opening and closing member 360. For example, the elastic member 370 may serve to fill a separation space that may exist between the pipeline 340 and the opening and closing member 360 in the slide-in state of the electronic device 300. Even if the pipeline 340 and the opening and closing member 360 have manufacturing tolerances, the electronic device 300 may completely seal between the pipeline 340 and the opening and closing member 360 by including the elastic member 370 whose length or width is elastically adjustable.

In an embodiment, when the elastic member 370 is disposed at one end of the opening and closing member 360, the elastic member 370 may directly contact or be separated from the pipeline 340 depending on the sliding of the electronic device 300. For example, in the slide-in state of the electronic device 300, the elastic member 370 comes into contact with the extension portion 342 of the pipeline 340, so that the second opening 3421 of the extension portion 342 can be sealed. In the slide-out state of the electronic device 300, the elastic member 370 may be separated from the extension portion 342 of the pipeline 340, so that the second opening 3421 of the extension portion 342 can be opened.

Referring to FIG. 6A, in the slide-in state of the electronic device 300, it may be difficult for the external air IN to flow into the electronic device 300. In the slide-in state of the electronic device 300, the opening and closing member 360 and/or the elastic member 370 may come into contact with the pipeline 340 to seal the second opening 3421 of the pipeline 340. When the second opening 3421 of the pipeline 340 is sealed, the external air IN may be prevented from flowing toward the inside of the electronic device 300.

Referring to FIGS. 6A and 6B, while the electronic device 300 is changed from the slide-in state to the slide-out state, the second housing 320 can slide in a direction away from the first housing 310. For example, the second housing 320 can slide in the length direction (e.g., the positive y-axis direction) of the electronic device 300 based on the first housing 310.

Referring to FIG. 6B, while the electronic device 300 according to an embodiment is changed from the slide-in state to the slide-out state, the air region AR may be formed and expanded inside the second housing 320.

In an embodiment, the air region AR refers to an empty space existing inside the second housing 320 and a space in which any structure (e.g., the printed circuit board 325) is not disposed. The air region AR refers to a space generated when a part of the second housing 320 escapes from a position overlapping with the first housing 310 as the second housing 320 slides with respect to the first housing 310.

Referring to FIG. 6B, the air region AR is illustrated as being formed in the shape of a rectangular parallelepiped inside the electronic device 300, and the air region AR formed inside the electronic device 300 may not be limited thereto.

In the slide-in state of the electronic device 300, because a part of the second housing 320 overlaps with the first housing 310, the air region AR may not exist or may be formed relatively small. In the slide-out state of the electronic device 300, because the second housing 320 slides away from the first housing 310 and is disposed so as not to overlap with the first housing 310, the air region AR may be formed relatively large compared to the slide-in state of the electronic device 300.

Referring to FIG. 6B, in the slide-out state of the electronic device 300, external air IN may flow into the electronic device 300. As the electronic device 300 is changed from the slide-in state to the slide-out state, the second opening 3421 is opened and the air region AR is formed so that the external air IN flows into the electronic device 300. The external air IN may flow into the electronic device 300 through the first opening 3411 of the pipeline 340. In the slide-out state of the electronic device 300, because the opening and closing member 360 or the elastic member 370 is spaced apart from the second opening 3421 of the pipeline 340, the second opening 3421 can be opened. The external air IN can flow toward the air region AR through the open second opening 3421.

As the second housing 320 slides out, the external air IN is introduced into the electronic device 300 and a flow of the external air IN flowing toward the air region AR is formed, so that the electronic device 300 according to an embodiment may not require a separate structure (e.g., a fan structure) for attracting the flow of the external air IN.

The electronic device 300 according to an embodiment can adjust the speed at which the external air IN is introduced into the electronic device 300, using the sliding speed of the electronic device 300 (e.g., the speed at which the second housing 320 slides relative to the first housing 310). For example, the introduction speed of the external air IN into the electronic device 300 may be adjusted by controlling the rotation speed of the driving motor 260 (see FIG. 4) that slides the second housing 320.

In an embodiment, in the slide-out state of the electronic device 300, the external air IN may come into contact with the air sensor 350 located in the pipeline 340 while flowing into the pipeline 340. The air sensor 350 that contacts the external air IN can measure the air quality of the external air IN. The air quality of the external air IN may refer to the amount of gas (e.g., $CO_2$, CO, NOx) contained in the external air IN or the amount of fine dust contained in the external air IN.

In an embodiment, the electronic device 300 can improve the speed at which the air sensor 350 detects the external air IN, by including the pipeline 340 that can be opened or closed depending on the sliding movement of the electronic device 300. For example, because the electronic device 300 according to an embodiment does not rely only on the natural diffusion of the external air IN, but uses the air flow based on the sliding movement of the electronic device 300, the sensing speed of the air sensor 350 can be improved.

In an embodiment, the electronic device 300 can improve the recovery speed of the air sensor 350 (e.g., the speed at which gas molecules on the surface of the air sensor 350 are removed). For example, because the electronic device 300 according to an embodiment does not rely only on the natural diffusion of the external air IN for the removal of external air molecules present on the sensor surface, but uses the air flow based on the sliding movement of the electronic device 300, the recovery speed of the air sensor 350 can be improved.

Figure 7:
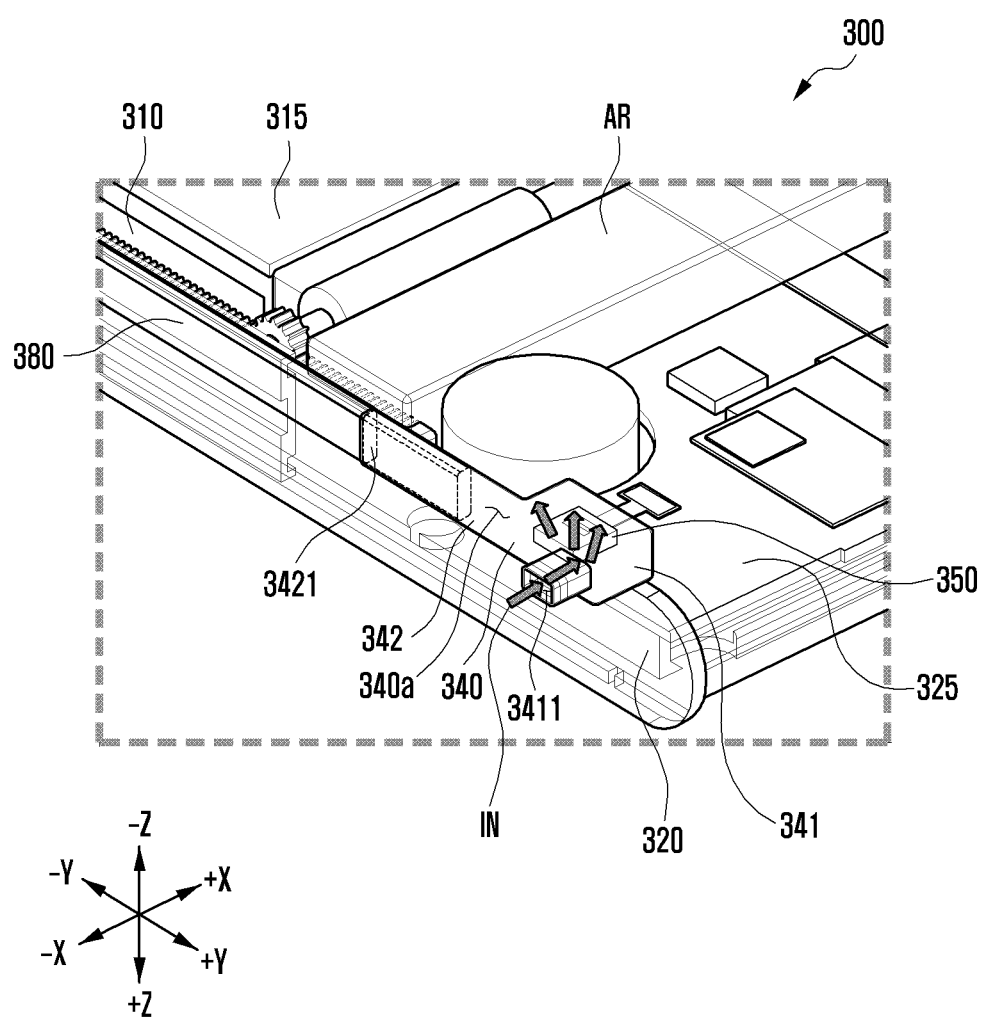
FIG. 7 is a diagram illustrating a pipeline and a piston member according to an embodiment of the disclosure.

FIG. 7 is a diagram illustrating a pipeline and a piston member according to an embodiment of the disclosure.

The electronic device 300 according to an embodiment of the disclosure may include the first housing 310, the second housing 320, the battery 315, the printed circuit board 325, the rollable display 330 (see FIG. 6A), the pipeline 340, the air sensor 350, and/or the piston member 380.

In an embodiment, at least a portion of the piston member 380 may be disposed in the first housing 310. For example, the at least a portion of the piston member 380 may be disposed at a position relatively close to one side surface of the first housing 310 inside the first housing 310. The one side surface of the first housing 310 may refer to a side surface of the first housing 310 facing the negative x-axis direction. The at least a portion of the piston member 380 may be disposed to be fixed to the first housing 310.

In an embodiment, at least a portion of the piston member 380 may be disposed inside the pipeline 340. For example, the piston member 380 may be disposed such that at least an end portion of the piston member 380 (e.g., an end portion of the piston member 380 toward the pipeline 340) is located inside the pipeline 340.

In an embodiment, when at least a portion of the piston member 380 is disposed inside the pipeline 340, one end of the pipeline 340 may be sealed. For example, the piston member 380 may be disposed to close the second opening 3421 of the pipeline 340.

In an embodiment, the length of the piston member 380 disposed inside the pipeline 340 may be changed depending on the sliding of the electronic device 300. For example, in the slide-in state of the electronic device 300, because the pipeline 340 moves in a direction toward the piston member 380 (e.g., the negative y-axis direction), the length of the piston member 380 disposed inside the pipeline 340 may be increased. In the slide-out state of the electronic device 300, because the pipeline 340 moves in a direction away from the piston member 380 (e.g., in the positive y-axis direction), the length of the piston member 380 disposed inside the pipeline 340 may be decreased.

In an embodiment, the size of an air inflow space 340a formed inside the pipeline 340 may be changed depending on the sliding of the electronic device 300. The air inflow space 340a may refer to a remaining space excluding a space for the piston member 380 in the inner space of the pipeline 340.

In an embodiment, in the slide-in state of the electronic device 300, because the length of the piston member 380 disposed inside the pipeline 340 is increased, the air inflow space 340a may be reduced. In the slide-out state of the electronic device 300, because the length of the piston member 380 disposed inside the pipeline 340 is decreased, the air inflow space 340a may be expanded.

In an embodiment, in the slide-out state of the electronic device 300, external air IN may flow into the electronic device 300. For example, in the slide-out state of the electronic device 300, the air inflow space 340a of the pipeline 340 is relatively expanded compared to the slide-in state of the electronic device 300, so that the pressure inside the pipeline 340 may be reduced. The reduced pressure inside the pipeline 340 facilitates the external air IN to be introduced into the pipeline 340.

In an embodiment, in the slide-in state of the electronic device 300, the flow of external air IN into the electronic device 300 may be blocked. In the slide-in state of the electronic device 300, the air inflow space 340a of the pipeline 340 is relatively reduced compared to the slide-out state of the electronic device 300, so that the pressure inside the pipeline 340 may be increased. The increased pressure inside the pipeline 340 may make it difficult for the external air IN to flow into the pipeline 340.

In an embodiment, in the slide-out state of the electronic device 300, the external air IN may come into contact with the air sensor 350 located in the pipeline 340 while flowing into the pipeline 340. The air sensor 350 that contacts the external air IN can measure the air quality of the external air IN.

In an embodiment, when at least a portion of the piston member 380 is disposed inside the pipeline 340, one end of the pipeline 340 may be sealed. For example, the second opening 3421 of the pipeline 340 located in a direction toward the first housing 310 may be sealed by the piston member 380. The sealed second opening 3421 can block the inflow of internal gas of the electronic device 300 into the pipeline 340. Because the internal gas of the electronic device 300 is blocked from flowing into the pipeline 340, any contamination of the air sensor 350 due to the internal gas of the electronic device 300 can be prevented.

In an embodiment, at least a portion of the piston member 380 may be disposed to seal the pipeline 340 regardless of the sliding state of the electronic device 300. For example, the piston member 380 may be disposed such that at least a portion of the piston member 380 seals the pipeline 340 in both the slide-in state and the slide-out state of the electronic device 300. When the piston member 380 is always disposed to seal the pipeline 340 regardless of the sliding state of the electronic device 300, the inflow of the internal gas of the electronic device 300 into the pipeline 340 can be completely blocked.

Figure 8A:
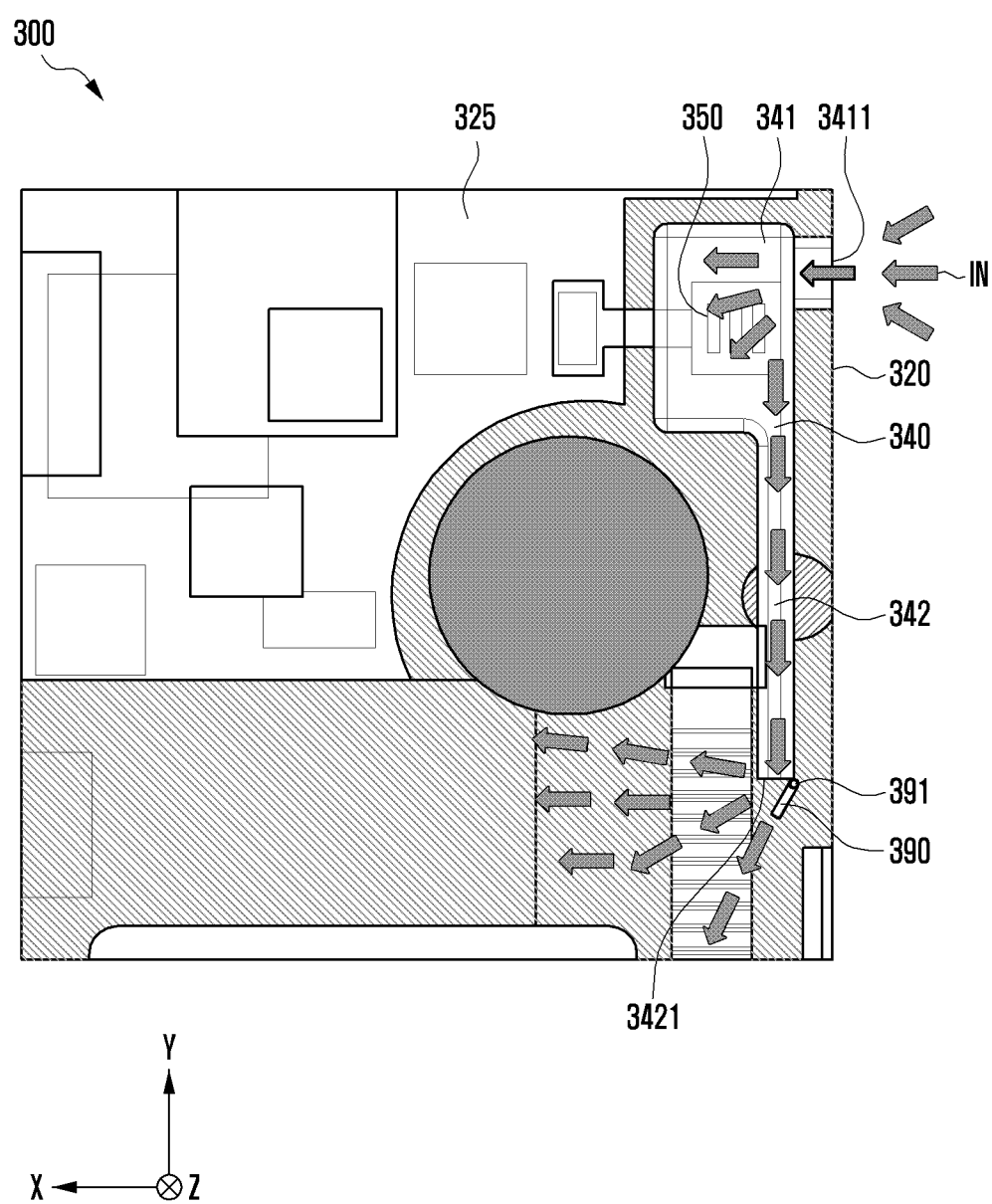
FIGS. 8A and 8B are diagrams illustrating a pipeline and a hinge member according to various embodiments of the disclosure.
Figure 8B:
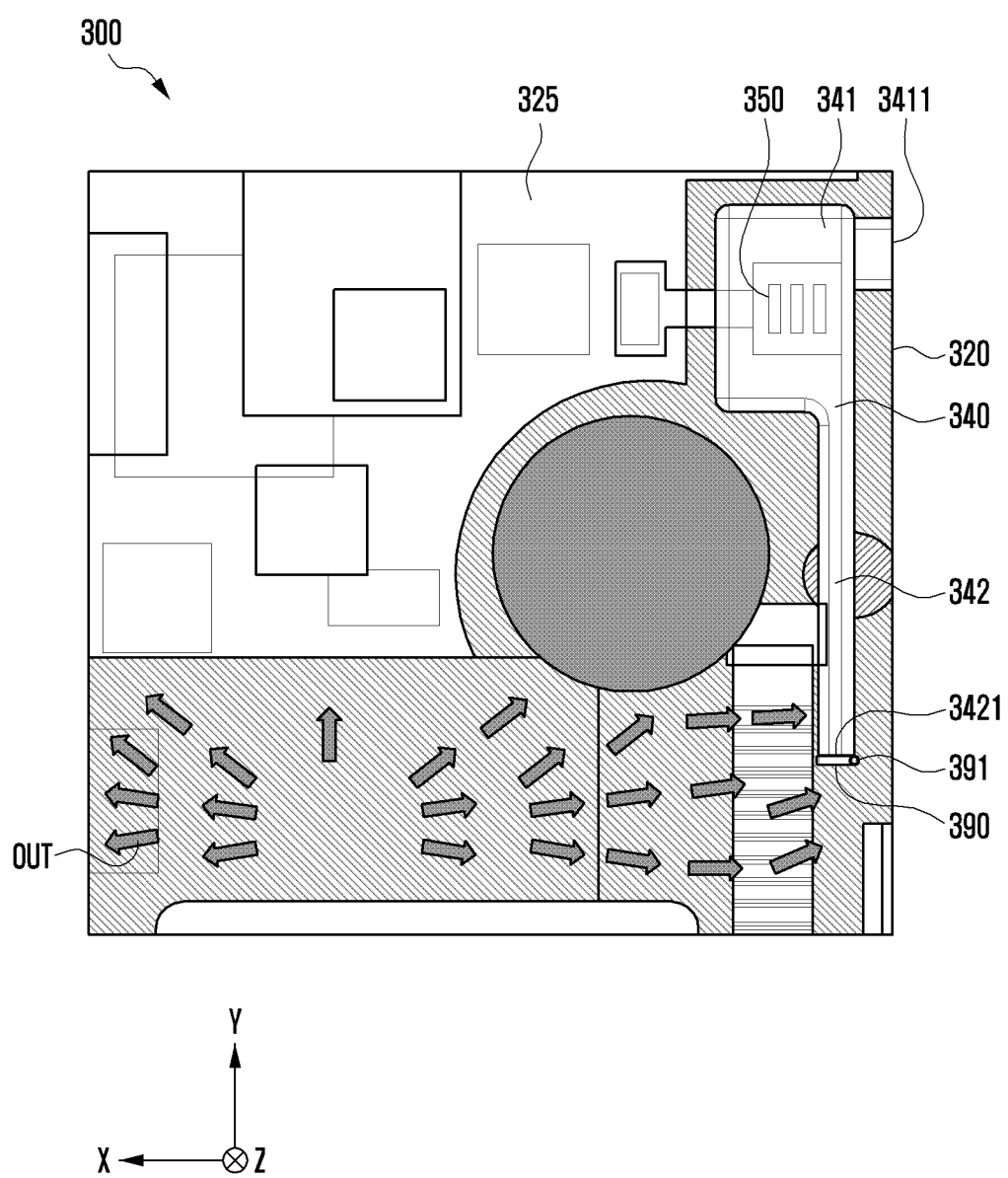

FIGS. 8A and 8B are diagrams illustrating a pipeline and a hinge member according to various embodiments of the disclosure.

FIG. 8A is a diagram illustrating a hinge member 390 when an electronic device 300 according to an embodiment of the disclosure is changing to the slide-out state.

FIG. 8B is a diagram illustrating a hinge member 390 when an electronic device 300 according to an embodiment of the disclosure is changing to the slide-in state.

The electronic device 300 according to an embodiment of the disclosure may include the first housing 310 (see FIG. 6A), the second housing 320, the battery 315 (see FIG. 6A), the printed circuit board 325, the rollable display 330 (see FIG. 6A), the pipeline 340, the air sensor 350, and/or the hinge member 390.

In an embodiment, the pipeline 340 may include the sensing portion 341 and/or the extension portion 342. The sensing portion 341 may have the first opening 3411, and the extension portion 342 may have the second opening 3421. The first opening 3411 may be an opening facing one side of the second housing 320 (e.g., the negative x-axis direction of the second housing 320). The second opening 3421 may be an opening disposed at an end of the extension portion 342 (e.g., an end of the extension portion 342 in the negative y-axis direction).

In an embodiment, the hinge member 390 may be disposed at an end of the pipeline 340. For example, the hinge member 390 may be disposed in the second opening 3421 formed at the end of the pipeline 340.

In an embodiment, the hinge member 390 may include a hinge axis 391. The hinge member 390 may be rotated by an external force about the hinge axis 391.

In an embodiment, the hinge member 390 may serve to open or close the second opening 3421 of the pipeline 340. When the hinge member 390 opens the second opening 3421 of the pipeline 340, gas outside the electronic device 300 may flow into the electronic device 300. When the hinge member 390 closes the second opening 3421 of the pipeline 340, gas outside the electronic device 300 may be difficult to flow into the electronic device 300.

In an embodiment, the hinge member 390 can be elastically rotated about the hinge axis 391. For example, the hinge member 390 can be rotated around the hinge axis 391 by an externally applied force, and can be rotated back toward an initial position when the externally applied force is removed.

Referring to FIGS. 8A and 8B, the hinge member 390 may be rotated about the hinge axis 391 depending on the sliding of the electronic device 300. For example, referring to FIG. 8A, when the electronic device 300 is changed to the slide-out state, the hinge member 390 may be rotated around the hinge axis 391 in a direction away from the pipeline 340. When the electronic device 300 is changed to the slide-out state, external air IN may be introduced into the electronic device 300 through the pipeline 340, and the introduced external air IN may rotate the hinge member 390 in a direction away from the second opening 3421 of the pipeline 340 about the hinge axis 391. As the hinge member 390 is rotated in a direction away from the second opening 3421, the second opening 3421 is opened, and the external air IN can be introduced into the electronic device 300 through the opened second opening 3421.

In an embodiment, when the electronic device 300 is changed to the slide-out state, the hinge member 390 is rotated and the external air IN may be introduced into the pipeline 340. The external air IN that flows into the pipeline 340 may come into contact with the air sensor 350 located in the pipeline 340. The air sensor 350 that contacts the external air IN can measure the air quality of the external air IN.

Referring to FIG. 8B, when the electronic device 300 is changed to the slide-in state, the hinge member 390 may be rotated around the hinge axis 391 in a direction closer to the pipeline 340. The hinge member 390 rotated in a direction closer to the pipeline 340 may come into contact with the second opening 3421 of the pipeline 340. As the hinge member 390 and the pipeline 340 may contact each other, the second opening 3421 of the pipeline 340 may be sealed.

Referring to FIG. 8B, when the electronic device 300 is changed to the slide-in state, the second opening 3421 of the pipeline 340 can be sealed through the hinge member 390, and the inflow of the internal gas OUT of the electronic device 300 into the pipeline 340 can be blocked. As the inflow of the internal gas OUT of the electronic device 300 into the pipeline 340 is blocked, contamination of the air sensor 350 due to the internal gas of the electronic device 300 can be prevented.

In an embodiment, the hinge member 390 may also be rotated by an electrical signal. For example, when the electronic device 300 is changed to the slide-out state, an electrical signal may be transmitted to the hinge member 390 to rotate the hinge member 390 in a direction away from the second opening 3421 of the pipeline 340. When the electronic device 300 changes to the slide-in state, an electrical signal may be transmitted to the hinge member 390 to rotate the hinge member 390 in a direction closer to the second opening 3421 of the pipeline 340.

Figure 9:
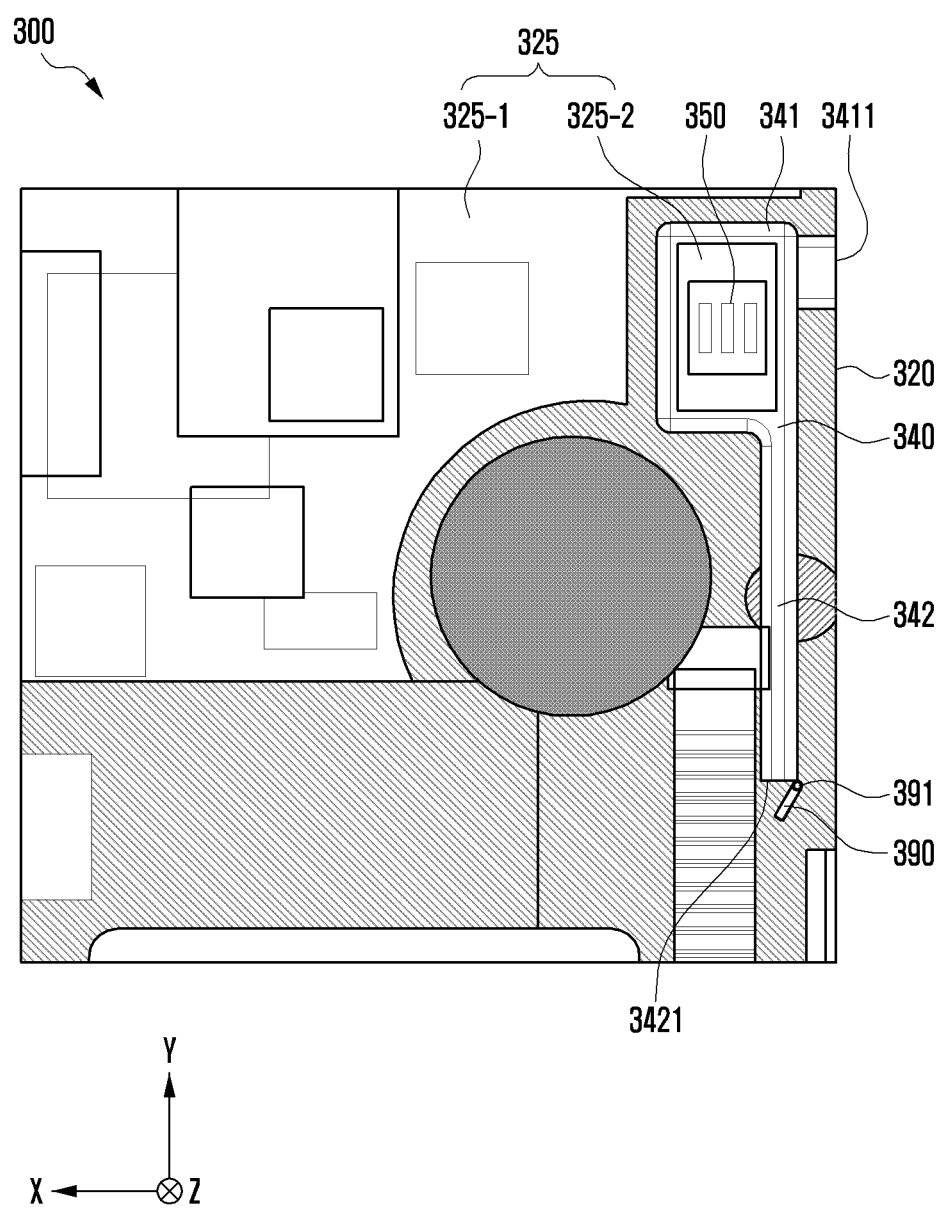
FIG. 9 is a diagram illustrating a printed circuit board disposed in a pipeline according to an embodiment of the disclosure.

FIG. 9 is a diagram illustrating a printed circuit board disposed in a pipeline according to an embodiment of the disclosure.

In an embodiment, the printed circuit board 325 may include a first substrate 325-1 and/or a second substrate 325-2. The first substrate 325-1 may refer to a first portion of the printed circuit board 325 disposed outside the pipeline 340. The second substrate 325-2 may refer to a second portion of the printed circuit board 325 disposed inside the pipeline 340. The second substrate 325-2 may be disposed in the sensing portion 341 of the pipeline 340.

In an embodiment, the air sensor 350 may be disposed on the second substrate 325-2. The air sensor 350 may be electrically connected to the second substrate 352-2. When the air sensor 350 is disposed on the second substrate 325-2, the air sensor 350 may not be separately connected to the first substrate 325-1 located outside the pipeline 340.

In an embodiment, when the external air IN flows into the pipeline 340, the air sensor 350 disposed on the second substrate 352-2 may come into contact with the external air IN and measure the air quality of the external air IN.

Referring to FIG. 9, the first substrate 325-1 and the second substrate 325-2 are illustrated as being separated from each other, and the shapes of the first and second substrates 325-1 and 325-2 may not be limited thereto. For example, the first substrate 325-1 and the second substrate 325-2 may be formed to be connected at least in part. When the first substrate 325-1 located outside the pipeline 340 and the second substrate 325-2 located inside the pipeline 340 are connected, the pipeline 340 may have a connection opening (not shown) for connecting the first and second substrates 325-1 and 325-2.

Figure 10:
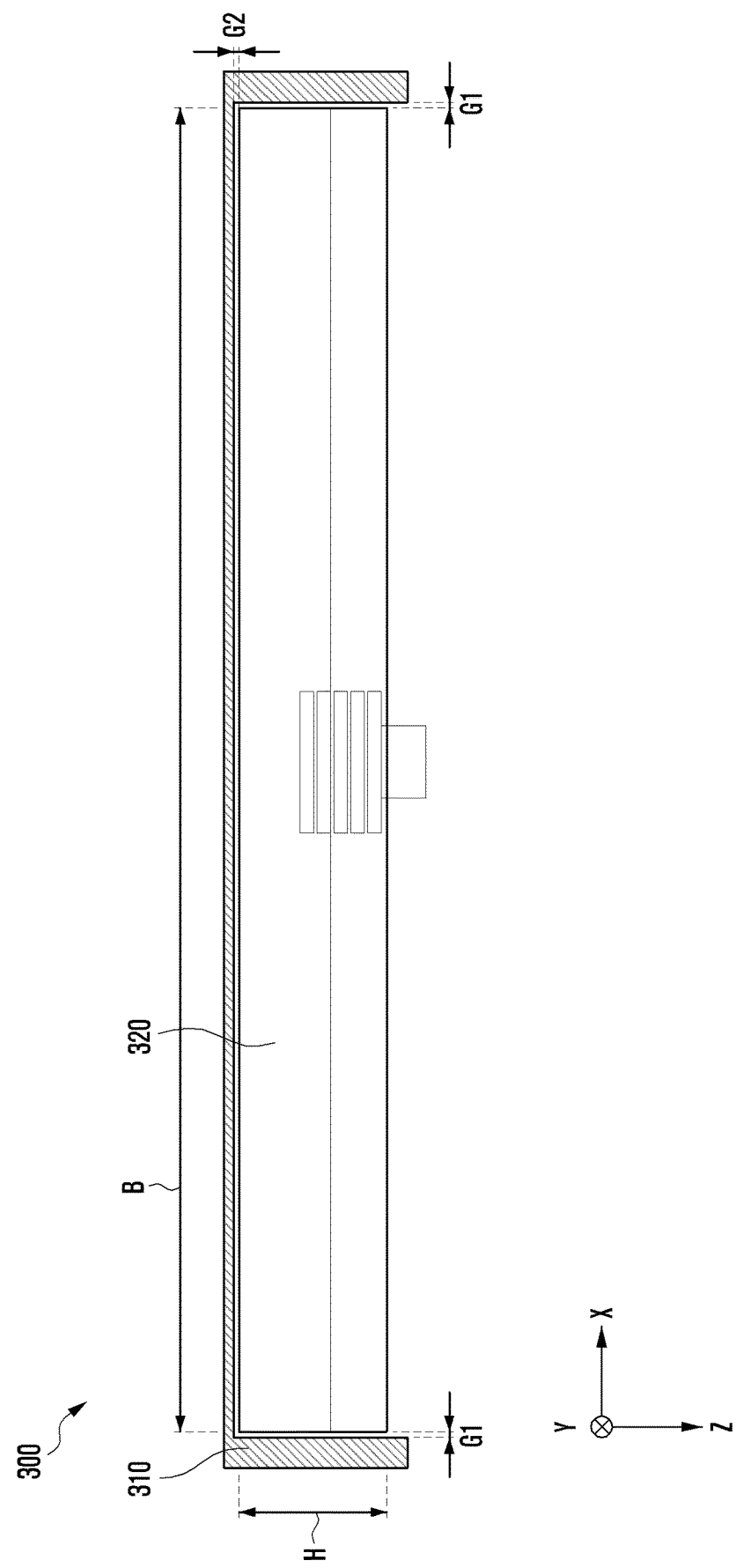
FIG. 10 is a diagram illustrating a first housing and a second housing according to an embodiment of the disclosure.

FIG. 10 is a diagram illustrating a first housing and a second housing according to an embodiment of the disclosure.

Referring to FIG. 10, a gap may exist between the first housing 310 and the second housing 320. For example, the first housing 310 and the second housing 320 may be disposed to be spaced apart from each other to allow the second housing 320 to be slidable relative to the first housing 310.

In an embodiment, the first housing 310 and the second housing 320 may be disposed to be spaced apart in the width direction (e.g., the x-axis direction) and height direction (e.g., the z-axis direction) of the electronic device 300. For example, referring to FIG. 10, the first housing 310 and the second housing 320 may be spaced apart from each other by a first separation distance G1 in the width direction (e.g., the x-axis direction) of the electronic device 300. The first housing 310 and the second housing 320 may be spaced apart from each other by a second separation distance G2 in the height direction (e.g., the z-axis direction) of the electronic device 300.

In an embodiment, the first separation distance G1 and the second separation distance G2 may have substantially the same length. For example, the first housing 310 and the second housing 320 may be disposed with substantially equal gaps in the width direction and the height direction of the electronic device 300.

In an embodiment, the first separation distance G1 and the second separation distance G2 may have different lengths. For example, a gap between the first and second housings 310 and 320 in the width direction of the electronic device 300 may be formed greater or smaller than a gap between the first and second housings 310 and 320 in the length direction of the electronic device 300.

In an embodiment, the width B of the second housing 320 may refer to the length of the second housing 320 extended in the width direction (e.g., the x-axis direction) of the electronic device 300. The height H of the second housing 320 may refer to the length of the second housing 320 extended in the height direction (e.g., the z-axis direction) of the electronic device 300.

In an embodiment, based on the first separation distance G1 and the second separation distance G2 between the first and second housings 310 and 320, a housing separation area S for the inflow of external air may be formed. For example, referring to Equation 1, a first housing separation area S1 may be formed by a value obtained by multiplying the width B of the second housing 320 and the second separation distance G2. Referring to Equation 2, a second housing separation area S2 may be formed by a value obtained by multiplying the height H of the second housing 320 and the first separation distance G1. The second housing separation area S2 may be formed on each of one side and the other side of the second housing 320. Referring to Equation 3, the housing separation area S may be formed by adding two second housing separation areas S2 to the first housing separation area S1.

$$S1 = G2 \times B \quad \text{Equation 1}$$

$$S2 = G1 \times H \quad \text{Equation 2}$$

$$S = S1 + 2 \times S2 \quad \text{Equation 3}$$

In an embodiment, the opening area of the first opening 3411 (see FIG. 6B) (e.g., the area of the opening through which air can flow in) may be formed larger than the housing separation area S formed by a gap between the first housing 310 and the second housing 320.

In an embodiment, a structure for preventing the inflow of foreign matter may be disposed between the first housing 310 and the second housing 320. For example, rubber and/or a sweeper structure may be disposed between the first housing 310 and the second housing 320 to prevent the inflow of foreign matter. When the structure for preventing the inflow of foreign matter is disposed between the first housing 310 and the second housing 320, the area formed by a gap between the first housing 310 and the second housing 320 may be smaller than the housing separation area S calculated by Equation 3.

In an embodiment, because the opening area of the first opening 3411 (see FIG. 6B) is larger than the housing separation area S, in the slide-out state of the electronic device 300, the external air IN (see FIG. 6B) is not introduced through the housing separation area S formed by a gap between the housings 310 and 320, but may be introduced through the first opening 3411 (see FIG. 6B) of the pipeline 340 (see FIG. 6B).

Figure 11:
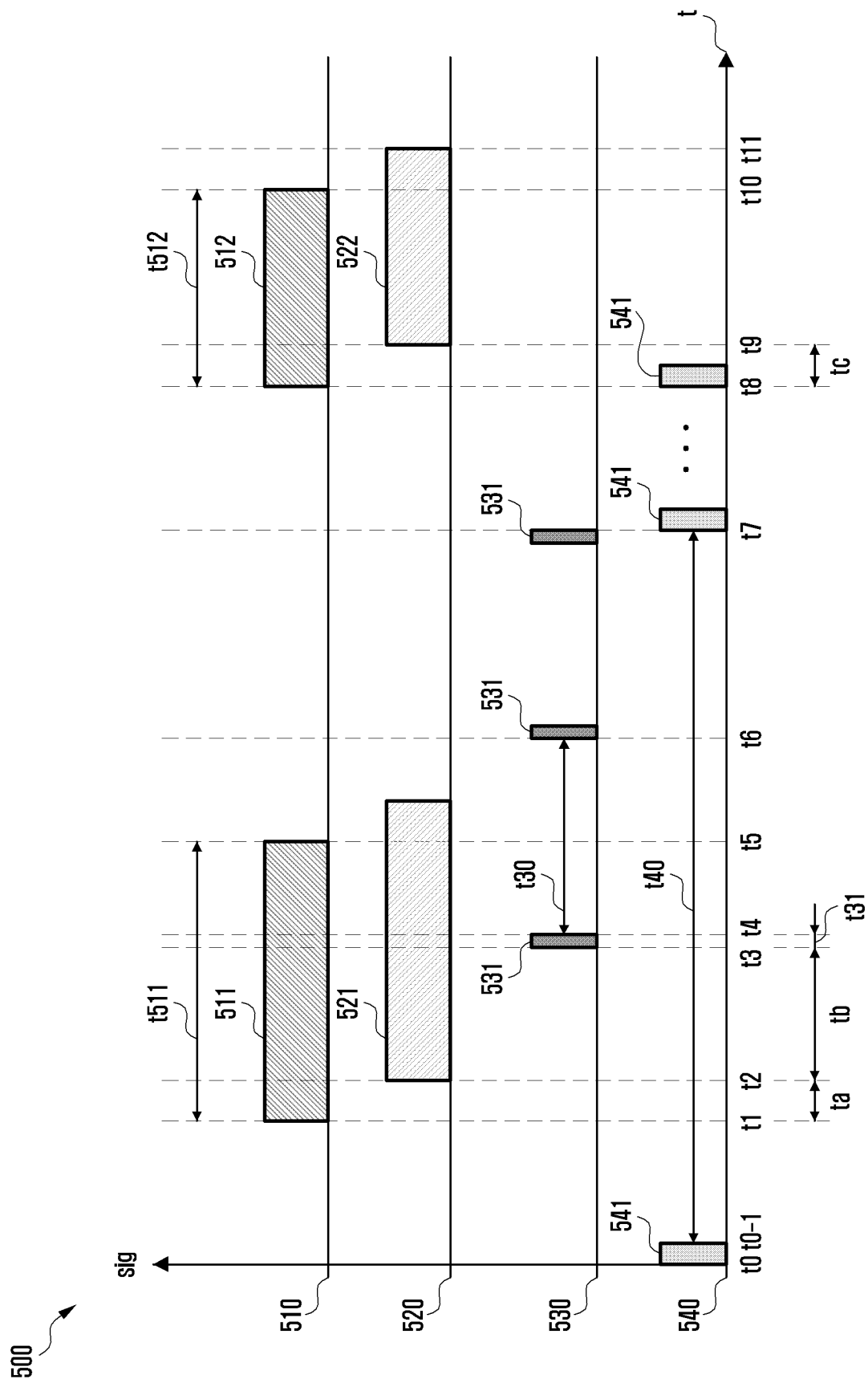
FIG. 11 is a diagram illustrating an external air sensing operation based on a sliding operation of an electronic device according to an embodiment of the disclosure.

FIG. 11 is a diagram illustrating an external air sensing operation based on a sliding operation of an electronic device according to an embodiment of the disclosure.

In a graph 500 shown in FIG. 11, the vertical axis (sig) denotes the state and/or operation of the electronic device 300, and the horizontal axis (t) denotes the passage of time.

The graph 500 shown in FIG. 11 represents a gas flow 520, a gas sensing operation 530, and a heating operation 540 according to the sliding operation 510 of the electronic device 300. For example, in the graph 500, the sliding operation 510 may include a slide-out operation 511 and/or a slide-in operation 512 of the electronic device 300. The gas flow 520 may include an external air inflow operation 521 of the external air (IN, see FIG. 8A) into the electronic device 300 and/or an outflow operation 522 of the internal gas (OUT, see FIG. 8B) from the electronic device 300. The gas sensing operation 530 may include an external air sensing operation 531 in which the air sensor 350 detects the external air IN. The heating operation 540 may include a heating operation 541 in which the electronic device 300 heats a portion to which the external air IN is adsorbed.

With reference to the graph 500, when the slide-out operation 511 of the electronic device 300 is started, the external air inflow operation 521, the external air sensing operation 531, and/or the heating operation 541 may be started with a time difference. For example, in the case that the slide-out operation 511 is started at a first time point t1, the external air inflow operation 521 may be started at a second time point t2 elapsed by a first elapsed time to from the first time point t1.

With reference to the graph 500, in the case that the external air inflow operation 521 is started at the second time point t2, the external air sensing operation 531 may be started at a third time point t3 elapsed by a second elapsed time tb from the second time point t2. The second elapsed time tb may be a time required for external air to flow in at a level equal to or greater than a predetermined standard. The external air sensing operation 531 may last from the third time point t3 to a fourth time point t4 by a detection holding time t31.

With reference to the graph 500, the slide-out operation 511 of the electronic device 300 may last from the first time point t1 to a fifth time point t5 by a slide-out holding time t511.

With reference to the graph 500, the electronic device 300 may perform the external air sensing operations 531 with a time difference of a detection time interval t30 from the fourth time point t4 at which the previous external air sensing operation 531 ends to a sixth time point t6 at which the next external air sensing operation 531 starts. For example, the detection time interval t30 may be approximately 1 second.

With reference to the graph 500, the electronic device 300 may perform the heating operations 541 with a time difference of a heating time interval t40 from a reference time point t0-1 at which the previous heating operation 541 ends to a seventh time point t7 at which the next heating operation 541 starts. For example, the heating time interval t40 may be approximately 60 seconds.

With reference to graph 500, the electronic device 300 may periodically perform the heating operation 541 with a time difference of the heating time interval t40. The electronic device 300 may remove moisture adsorbed to the air sensor 350 by periodically performing the heating operation 541.

With reference to the graph 500, when the slide-in operation 512 is started, the outflow operation 522 of the internal gas from the electronic device 300 may be started with a time difference. When the slide-in operation 512 is started at an eighth time point t8, the internal gas outflow operation 522 may be started at a ninth time point t9 elapsed by a third elapsed time tc from the eighth time point t8.

With reference to the graph 500, the slide-in operation 512 of the electronic device 300 may last from the eighth time point t8 to a tenth time point t10 by a slide-in holding time t512.

In an embodiment, during the slide-in operation 512 of the electronic device 300, the electronic device 300 may not perform the external air sensing operation 531. For example, because external air does not flow into the electronic device 300 during the slide-in operation 512 of the electronic device 300, the electronic device 300 may not perform the external air sensing operation 531.

In an embodiment, the slide-out operation 511 of the electronic device 300 may be maintained longer than the slide-in operation 512. For example, the slide-out holding time t511 may be longer than the slide-in holding time t512. The relatively longer slide-out holding time t511 may be more advantageous for the air sensor 350 to detect the external air IN, and may reduce the influence of the internal gas OUT of the electronic device 300 on the air sensor 350.

With reference to the graph 500, the slide-out holding time t511 of the electronic device 300 is shown to be longer than the slide-in holding time t512, and relative lengths of the slide-out holding time t511 and the slide-in holding time t512 may not be limited thereto.

In an embodiment, the slide-out operation 511 and/or the slide-in operation 512 of the electronic device 300 may start automatically. For example, in the case that a specific component (e.g., carbon monoxide) of external air detected by the electronic device 300 exceeds a predetermined standard (e.g., 200 ppm or more of carbon monoxide), the slide-out operation 511 and/or the slide-in operation 512 of the electronic device 300 may be automatically performed in a predetermined period.

In an embodiment, the period in which the slide-out operation 511 and/or the slide-in operation 512 of the electronic device 300 is performed may be changed depending on the remaining battery capacity of the electronic device 300. For example, when the remaining battery capacity of the electronic device 300 is less than or equal to a predetermined standard, the period in which the slide-out operation 511 and/or the slide-in operation 512 of the electronic device 300 is performed may be formed to be relatively long.

According to an embodiment of the disclosure, an electronic device 300 may include a first housing 310; a second housing 320 slidably disposed with the first housing 310; a rollable display 330 having a display area reduced or expanded based on slide-in or slide-out of the second housing 320; a pipeline 340 having a first opening 3411 disposed on one side of the second housing 320 for an inflow of external air IN flows, having a second opening 3421 disposed in a direction toward the first housing 310, and extending from the first opening 3411 in a direction toward the second opening 3421; an air sensor 350 disposed at least in part inside the pipeline 340; and an opening and closing member 360 disposed to be fixed to the first housing 310 and opening or closing the second opening 3421 of the pipeline 340 based on slide-in or slide-out of the second housing 320.

In an embodiment, the electronic device 300 may further include an elastic member 370 disposed at an end of the opening and closing member 360 and, in the slide-in of the second housing 320, closing the second opening 3421 by coming into contact with the second opening 3421.

In an embodiment, the pipeline 340 may include a sensing portion 341 in which the first opening 3411 and the air sensor 350 are disposed, and an extension portion 342 extending from the sensing portion 341 in a direction toward the second housing 320.

In an embodiment, the sensing portion 341 may be formed to have a greater width than the extension portion 342.

In an embodiment, the air sensor 350 may include a gas sensor or a fine dust sensor.

In an embodiment, in the slide-in of the second housing 320, the second opening 3421 and the opening and closing member 360 may be in contact with each other to close the second opening 3421, and in the slide-out of the second housing 320, the second opening 3421 and the opening and closing member 360 may be spaced apart from each other to open the second opening 3421.

In an embodiment, in the slide-out of the second housing 320, external air IN may flow into the first opening 3411 of the pipeline 340 and flow through the second opening 3421 into an air region AR formed inside the second housing 320.

In an embodiment, in the slide-out of the second housing 320, the air sensor 350 may start an external air sensing operation 531 after a predetermined time elapses from a time point at which the external air IN flows into the first opening 3411 of the pipeline 340.

In an embodiment, an opening area formed by the first opening 3411 of the pipeline 340 may be greater than a housing separation area S formed by a gap between the first housing 310 and the second housing 320.

According to an embodiment of the disclosure, an electronic device 300 may include a first housing 310; a second housing 320 slidably disposed with the first housing 310; a rollable display 330 having a display area reduced or expanded based on slide-in or slide-out of the second housing 320; a pipeline 340 having a first opening 3411 disposed on one side of the second housing 320 for an inflow of external air IN flows, having a second opening 3421 disposed in a direction toward the first housing 310, and extending from the first opening 3411 in a direction toward the second opening 3421; an air sensor 350 disposed at least in part inside the pipeline 340; and a piston member 380 fixed at least in part to the first housing 310, disposed at least in part inside the pipeline 340, and moving in the pipeline 340 based on slide-in or slide-out of the second housing 320.

In an embodiment, in the slide-in of the second housing 320, the piston member 380 may move in a direction of reducing an air inflow space 340a inside the pipeline 340.

In an embodiment, in the slide-out of the second housing 320, the piston member 380 may move in a direction of increasing the air inflow space 340a inside the pipeline 340.

In an embodiment, in the slide-out of the second housing 320, external air IN may flow into the first opening 3411 of the pipeline 340 and flow toward the air inflow space 340a inside the pipeline 340.

According to an embodiment of the disclosure, an electronic device 300 may include a first housing 310; a second housing 320 slidably disposed with the first housing 310; a rollable display 330 having a display area reduced or expanded based on slide-in or slide-out of the second housing 320; a pipeline 340 having a first opening 3411 disposed on one side of the second housing 320 for an inflow of external air IN flows, having a second opening 3421 disposed in a direction toward the first housing 310, and extending from the first opening 3411 in a direction toward the second opening 3421; an air sensor 350 disposed at least in part inside the pipeline 340; and a hinge member 390 disposed in the second opening 3421 of the pipeline 340 and closing or opening one end of the pipeline 340 based on slide-in or slide-out of the second housing 320.

In an embodiment, in the slide-in of the second housing 320, the hinge member 390 may rotate to come into contact with the second opening 3421 and close the second opening 3421.

In an embodiment, in the slide-out of the second housing 320, the hinge member 390 may rotate away from the second opening 3421 and open the second opening 3421.

In an embodiment, in the slide-out of the second housing 320, external air IN may flow into the first opening 3411 of the pipeline 340 and flow through the second opening 3421 into an air region AR formed inside the second housing 320.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, or a home appliance. The electronic devices according to embodiments of the disclosure are not limited to those described above.

It should be appreciated that embodiments of the disclosure and the terms used therein are not intended to limit the technological features set forth herein to particular embodiments and include various changes, equivalents, or replacements for a corresponding embodiment. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it denotes that the element may be coupled with the other element directly (e.g., wiredly), wirelessly, or via a third element.

As used in connection with an embodiment of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., module or program) of the above-described components may include a singular or a plurality of entities, and some of the plurality of entities may be separately disposed in any other component. According to an embodiment, one or more components or operations among the above-described components may be omitted, or one or more other components or operations may be added. Alternatively or additionally, a plurality of components (e.g., module or program) may be integrated into one component. In this case, the integrated component may perform one or more functions of each component of the plurality of components identically or similarly to those performed by the corresponding component among the plurality of components prior to the integration.

According to an embodiment, operations performed by a module, program, or other component may be executed sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first housing;
a second housing slidably disposed with the first housing;
a rollable display having a display area reduced or expanded based on a slide-in or slide-out of the second housing;
a pipeline having a first opening disposed on one side of the second housing for an inflow of external air flows, having a second opening disposed in a direction toward the first housing, and extending from the first opening in a direction toward the second opening;
an air sensor disposed at least in part inside the pipeline; and
an opening and closing member disposed to be fixed to the first housing and opening or closing the second opening of the pipeline based on the slide-in or slide-out of the second housing.

2. The electronic device of claim 1, further comprising:
an elastic member disposed at an end of the opening and closing member and, in the slide-in of the second housing, closing the second opening by coming into contact with the second opening.

3. The electronic device of claim 1, wherein the pipeline includes:
a sensing portion in which the first opening and the air sensor are disposed; and
an extension portion extending from the sensing portion in a direction toward the second housing.

4. The electronic device of claim 3, wherein the sensing portion is formed to have a greater width than the extension portion.

5. The electronic device of claim 1, wherein the air sensor includes a gas sensor or a fine dust sensor.

6. The electronic device of claim 1,
wherein in the slide-in of the second housing, the second opening and the opening and closing member are in contact with each other to close the second opening, and
wherein in the slide-out of the second housing, the second opening and the opening and closing member are spaced apart from each other to open the second opening.

7. The electronic device of claim 6, wherein in the slide-out of the second housing, external air flows into the first opening of the pipeline and flows through the second opening into an air region formed inside the second housing.

8. The electronic device of claim 7, wherein in the slide-out of the second housing, the air sensor starts a sensing operation after a predetermined time elapses from a time point at which the external air flows into the first opening of the pipeline.

9. The electronic device of claim 1, wherein an opening area formed by the first opening of the pipeline is greater than a housing separation area formed by a gap between the first housing and the second housing.

10. An electronic device comprising:
a first housing;
a second housing slidably disposed with the first housing;
a rollable display having a display area reduced or expanded based on a slide-in or slide-out of the second housing;
a pipeline having a first opening disposed on one side of the second housing for an inflow of external air flows, having a second opening disposed in a direction toward the first housing, and extending from the first opening in a direction toward the second opening;
an air sensor disposed at least in part inside the pipeline; and
a piston member fixed at least in part to the first housing, disposed at least in part inside the pipeline, and moving in the pipeline based on the slide-in or slide-out of the second housing.

11. The electronic device of claim 10, wherein the pipeline includes:
a sensing portion in which the first opening and the air sensor are disposed; and
an extension portion extending from the sensing portion in a direction toward the second housing.

12. The electronic device of claim 11, wherein the sensing portion is formed to have a greater width than the extension portion.

13. The electronic device of claim 10, wherein the air sensor includes a gas sensor or a fine dust sensor.

14. The electronic device of claim 10,
wherein in the slide-in of the second housing, the piston member moves in a direction of reducing an air inflow space inside the pipeline, and
wherein in the slide-out of the second housing, the piston member moves in a direction of increasing the air inflow space inside the pipeline.

15. The electronic device of claim 14, wherein in the slide-out of the second housing, external air flows into the first opening of the pipeline and flows toward the air inflow space inside the pipeline.

16. An electronic device comprising:
a first housing;
a second housing slidably disposed with the first housing;
a rollable display having a display area reduced or expanded based on slide-in or slide-out of the second housing;
a pipeline having a first opening disposed on one side of the second housing for an inflow of external air flows, having a second opening disposed in a direction toward the first housing, and extending from the first opening in a direction toward the second opening;
an air sensor disposed at least in part inside the pipeline; and
a hinge member disposed in the second opening of the pipeline and closing or opening one end of the pipeline based on slide-in or slide-out of the second housing.

17. The electronic device of claim 16, wherein the pipeline includes:
a sensing portion in which the first opening and the air sensor are disposed; and
an extension portion extending from the sensing portion in a direction toward the second housing.

18. The electronic device of claim 16, wherein the air sensor includes a gas sensor or a fine dust sensor.

19. The electronic device of claim 16,
wherein in the slide-in of the second housing, the hinge member rotates to come into contact with the second opening and closes the second opening,
wherein in the slide-out of the second housing, the hinge member rotates away from the second opening and opens the second opening, and
wherein the hinge member rotates in response to a received electrical signal, the electrical signal transmitted in response to the slide-in or slide-out of the second housing.

20. The electronic device of claim 19, wherein in the slide-out of the second housing, external air flows into the first opening of the pipeline and flows through the second opening into an air region formed inside the second housing.

* * * * *